(12) United States Patent
Chen et al.

(10) Patent No.: US 8,421,986 B2
(45) Date of Patent: Apr. 16, 2013

(54) SUBSTRATE WITH MULTI-DOMAIN VERTICAL ALIGNMENT PIXEL STRUCTURE AND FABRICATING METHOD THEREOF, LIQUID CRYSTAL DISPLAY PANEL AND LIQUID CRYSTAL DISPLAY

(75) Inventors: Jian-Cheng Chen, Miao-Li County (TW); Chien-Hong Chen, Miao-Li County (TW); Chih-Yung Hsieh, Miao-Li County (TW); Wei Lo, Miao-Li County (TW); Chun-Hsu Lin, Miao-Li County (TW); Ching-Che Yang, Miao-Li County (TW); Jia-Lun Chen, Miao-Li County (TW)

(73) Assignee: Chimei Innolux Corporation (TW)

( * ) Notice: Subject to any disclaimer, the term of this patent is extended or adjusted under 35 U.S.C. 154(b) by 278 days.

(21) Appl. No.: 12/980,738

(22) Filed: Dec. 29, 2010

(65) Prior Publication Data
US 2011/0157537 A1    Jun. 30, 2011

(30) Foreign Application Priority Data
Dec. 31, 2009 (TW) .............................. 98146416 A

(51) Int. Cl.
*G02F 1/1333* (2006.01)
*G02F 1/1337* (2006.01)
*G02F 1/1343* (2006.01)

(52) U.S. Cl.
USPC ............ 349/158; 349/129; 349/130; 349/147

(58) Field of Classification Search .................. 349/158, 349/129, 130, 147
See application file for complete search history.

(56) References Cited

U.S. PATENT DOCUMENTS

| 6,888,602 | B2 * | 5/2005 | Takeda et al. ................. 349/141 |
| 6,897,929 | B2 * | 5/2005 | Takeda et al. ................. 349/129 |
| 7,880,845 | B2 * | 2/2011 | Lee et al. ...................... 349/129 |
| 7,880,852 | B2 * | 2/2011 | Kim .............................. 349/145 |
| 8,094,284 | B2 * | 1/2012 | Yang et al. .................... 349/146 |
| 2008/0278651 | A1 * | 11/2008 | Lee et al. ....................... 349/43 |

FOREIGN PATENT DOCUMENTS
TW    I281065    5/2007
TW    I298813    7/2008

OTHER PUBLICATIONS
Office Action from corresponding application No. TW098146416.

* cited by examiner

*Primary Examiner* — Mike Qi
(74) *Attorney, Agent, or Firm* — Lowe Hauptman Ham & Berner, LLP

(57) ABSTRACT

A substrate with a multi-domain vertical alignment pixel structure is provided. The substrate is opposite to a counter substrate with a common electrode, and a liquid crystal layer is disposed between the substrate and the counter substrate. The substrate includes a scan line and a data line, an active device, first and second patterned pixel electrodes and a voltage drop layer. Wherein, the first patterned pixel electrode provides a first electrical field to the liquid crystal layer, and the second patterned pixel electrode provides a second electrical field to the liquid crystal layer. The voltage drop layer makes the first electrical field smaller than the second electrical field.

30 Claims, 29 Drawing Sheets

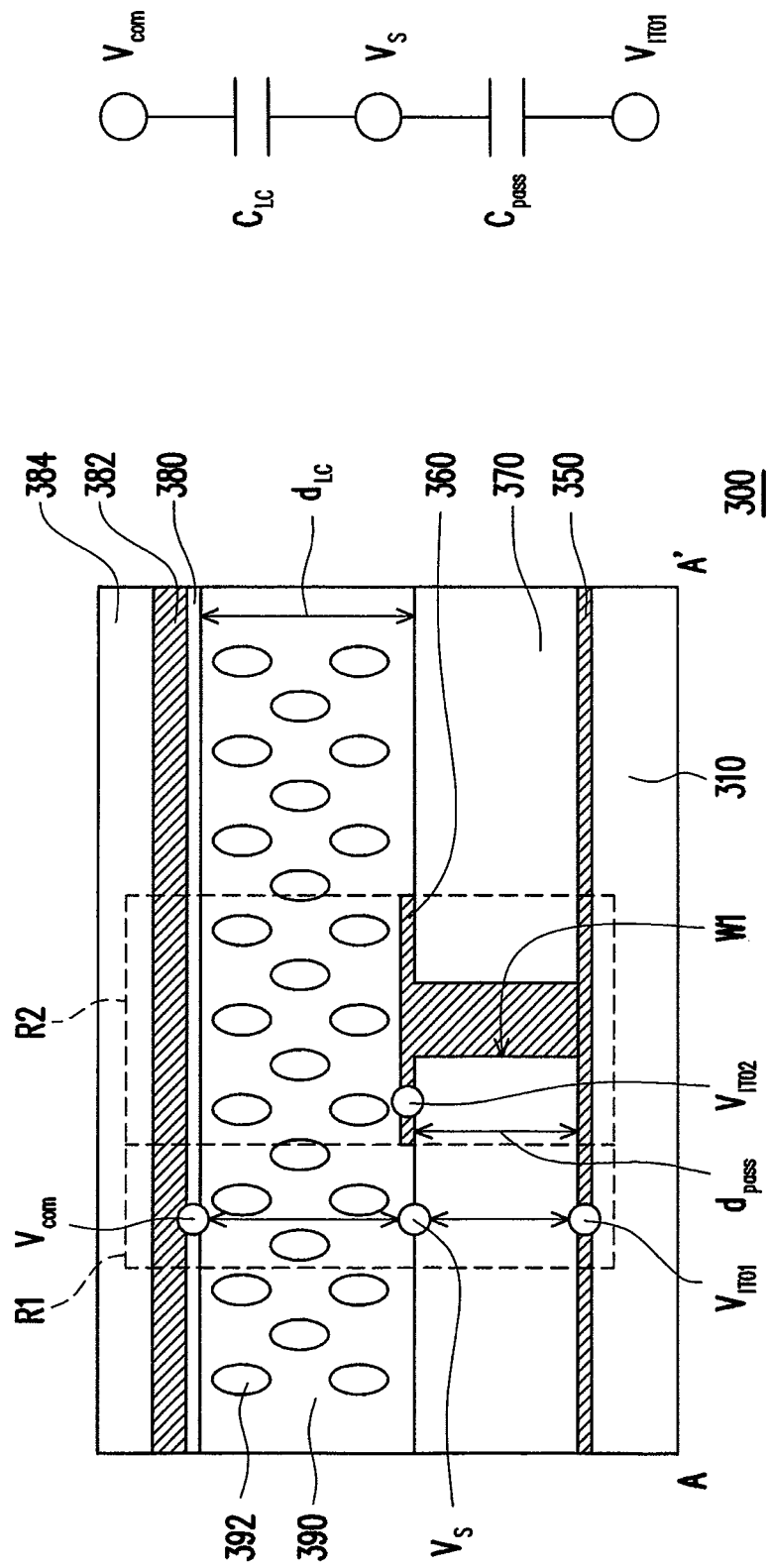

US 8,421,986 B2

SUBSTRATE WITH MULTI-DOMAIN VERTICAL ALIGNMENT PIXEL STRUCTURE AND FABRICATING METHOD THEREOF, LIQUID CRYSTAL DISPLAY PANEL AND LIQUID CRYSTAL DISPLAY

CROSS-REFERENCE TO RELATED APPLICATION

This application claims the priority benefit of Taiwan application serial no. 98146416, filed on Dec. 31, 2009. The entirety of the above-mentioned patent application is hereby incorporated by reference herein and made a part of specification.

BACKGROUND OF THE INVENTION

1. Field of the Invention

The present invention relates to a substrate with a pixel structure and a fabricating method thereof, and a liquid crystal display panel and liquid crystal display with the substrate, and more particularly relates to a substrate with a multi-domain vertical alignment (MVA) pixel structure featured by a low color shift (LCS) and less dark fringes and a fabricating method thereof, and a liquid crystal display panel and liquid crystal display with the substrate.

2. Description of Related Art

An LCD display has the characteristics of high picture quality, high space efficiency, low power consumption, no radiation and so on. Currently, the following types of LCD display with a good display effect have been proposed, such as IPS (in-plane switching) LCD display, FFS (fringe field switching) LCD display, MVA (multi-domain vertical alignment) LCD display and PSA (Polymer-stabilized alignment) LCD display and so on.

FIG. 1 is a schematic cross-sectional view of a multi-domain vertical alignment liquid crystal display panel. Referring to FIG. 1, the multi-domain vertical alignment liquid crystal display panel 100 includes a first substrate 110, a pixel electrode 120, a liquid crystal layer 130, a common electrode 140, a color filter layer 150 and a second substrate 160. It should be noted that, a slit S is disposed on the pixel electrode 120 and the common electrode 140 and the formed electrical field E is bent under the influence of the slit S. Therefore, liquid crystal molecules 132 are inclined towards different directions to form a distribution of a plurality of regions, thereby achieving a display effect of wide viewing angle. However, this multi-domain vertical alignment liquid crystal display panel 100 needs a precise alignment of upper and lower slits S. Otherwise, once the alignment error between upper and lower slit S is generated, the alignment region is uneven and the light transmittance is reduced.

FIG. (1) and FIG. (2) of FIG. 2A are schematic top views of a multi-domain vertical alignment liquid crystal display panel respectively. FIG. (1) and FIG. (2) of FIG. 2B are schematic cross-sectional views of the multi-domain vertical alignment liquid crystal display panel in FIG. (1) and FIG. (2) of FIG. 2A taken along Line I-I' respectively. FIG. (1) and FIG. (2) of FIG. 2C are schematic top views of pixel electrodes 120, 120' of the multi-domain vertical alignment liquid crystal display panel in FIG. (1) and FIG. (2) of FIG. 2A respectively. FIG. (1) and FIG. (2) of FIG. 2D are schematic top views of pixel electrodes 122, 122' of a multi-domain vertical alignment liquid crystal display panel in FIG. (1) and FIG. (2) of FIG. 2A respectively.

Referring to FIG. (1) of FIG. 2A to FIG. (1) of FIG. 2D, the components of the multi-domain vertical alignment liquid crystal display panel 200 are the same as those of the multi-domain vertical alignment liquid crystal display panel 100, so the components are indicated by the identical symbols.

It should be noted that in the multi-domain vertical alignment liquid crystal display panel 200, two layers of the pixel electrodes 120, 122 with the slit S are fabricated on the same side instead of fabricating the slit S on the common electrode 140. A protection layer 170 is additionally disposed between the pixel electrodes 120, 122. This method can solve the problem of alignment error, but the structure with the slit S may generate the dark fringe to reduce the light transmittance.

To reduce the number of dark fringes of the multi-domain vertical alignment liquid crystal display panel, another multi-domain vertical alignment liquid crystal display panel 200' is provided in the prior art. Referring to FIG. (2) of FIG. 2A to FIG. (2) of FIG. 2D together, the components of the multi-domain vertical alignment liquid crystal display panel 200' are the same as those of the multi-domain vertical alignment liquid crystal display panel 200, so the components are indicated by the identical symbols. In the multi-domain vertical alignment liquid crystal display panel 200', the configuration of the pixel electrodes 120', 122' can reduce the number of dark fringes.

The aforementioned multi-domain vertical alignment liquid crystal display panels 200, 200' respectively use two thin-film transistors 210, 220, 210', 220' to drive the pixel electrodes 120, 122, 120', 122'. For example, in FIG. (1) of FIG. 2B, the thin-film transistor 210 is connected to the pixel electrode 120 and the thin-film transistor 220 is connected to the pixel electrode 122. In more details, the thin-film transistor 210 applies a low voltage ($V_L$) to the pixel electrode 120 to form dark area and the thin-film transistor 220 applies a high voltage ($V_H$) to the pixel electrode 122 to form bright area. Whereby, the multi-domain vertical alignment liquid crystal display panel 200 generates a display effect of a low color shift. However, in regard with the manner of using two thin-film transistors 210, 220 to drive two layers of pixel electrodes 120, 122, the driving design is complicated, and more number of the thin-film transistors 210, 220 is required, which causes the increase of the fabricating cost.

In addition, as shown in FIG. (1) of FIG. 2A, the multi-domain vertical alignment liquid crystal display panel 200 mainly uses a zigzag elongated pixel electrode pattern J to control an inclining direction of the liquid crystal molecules 132. However, a fringe field of the zigzag elongated pixel electrode pattern J cannot completely cover the slit S region, so the region with the slit S may present an optical performance of dark fringes. Although the processing method may be adopted to increase the width of the elongated pixel electrode pattern J (downsizing the slit S) and further improve the fringe field of the elongated pixel electrode pattern J, currently, the process width limit of the resolution and the etching process capability of the exposure machine is 3.5 μm, so the width of the elongated pixel electrode pattern J cannot be effectively increased in practice.

FIG. 3 is a schematic cross-sectional view of another multi-domain vertical alignment liquid crystal display panel. Referring to FIG. 3, the multi-domain vertical alignment liquid crystal display panel 202 includes a first substrate 110, a protection layer 170, a first pixel electrode 122a, a second pixel electrode 122b, a liquid crystal layer 130, a common electrode 140 and a second substrate 160.

In consideration of a low color shift, the distribution of bright and dark areas must be formed. To achieve a good light transmittance, normally the pixel electrode is sliced into the first pixel electrode 122a and the second pixel electrode 122b distributed in the left and right or the up and down, which are respectively applied with the high voltage ($V_H$) and the low voltage (V). However, the electrical field E formed at the slit S between the first pixel electrode 122a and the second pixel electrode 122b makes the liquid crystal molecules 132 at the slit S inclined into the opaque status. Therefore, three dark fringes are generated at arrow A (three positions) in FIG. 3A, which reduces the display quality of the multi-domain vertical alignment liquid crystal display panel 202.

SUMMARY OF THE INVENTION

Accordingly, the present invention provides a substrate with a multi-domain vertical alignment pixel structure, which has a low fabricating cost, simple structure, and has a low color shift effect and less dark fringes.

The present invention also provides a liquid crystal display panel having the above substrate and capable of providing a good display quality.

The present invention provides a liquid crystal display having the above liquid crystal display panel and capable of providing a good display quality.

The present invention still provides a fabricating method of a substrate with a multi-domain vertical alignment pixel structure, which can fabricates a substrate having a low fabricating cost, a low color shift effect and less dark fringes.

As broadly described and embodied herein, a first invention of the present invention is a substrate with a multi-domain vertical alignment pixel structure. The substrate is opposite to a counter substrate with a common electrode, and a liquid crystal layer is disposed between the substrate and the counter substrate. The substrate includes a scan line and a data line, an active device, first and second patterned pixel electrodes and a voltage drop layer. The scan line and the data line divide the substrate into a plurality of pixel regions. The active device is electrically connected with the scan line and the data line. The first patterned pixel electrode is electrically connected with the active device. The voltage drop layer is disposed above the first patterned pixel electrode. The second patterned pixel electrode is disposed above the first patterned pixel electrode and is electrically connected with the active device. The first patterned pixel electrode and the second patterned pixel electrode are equipotential. The first patterned pixel electrode provides a first electrical field to the liquid crystal layer, and the second patterned pixel electrode provides a second electrical field to the liquid crystal layer. The voltage drop layer makes the first electrical field smaller than the second electrical field.

The present invention also provides a liquid crystal display panel. The liquid crystal display panel includes the above substrate, a counter substrate and a liquid crystal layer. The counter substrate has a common electrode, a counter substrate is disposed on a counter side of the substrate, and the common electrode is corresponding to the first and the second patterned pixel electrodes. The liquid crystal layer is sandwiched between the counter substrate and the substrate. The first patterned pixel electrode and the second patterned pixel electrode are equipotential. The first patterned pixel electrode provides a first electrical field to the liquid crystal layer, and the second patterned pixel electrode provides a second electrical field to the liquid crystal layer. The voltage drop layer makes the first electrical field smaller than the second electrical field.

The present invention still provides a liquid crystal display. The liquid crystal display includes a backlight module and the above liquid crystal display panel. The liquid crystal display panel is disposed above the backlight module. The present invention yet provides a fabricating method of a substrate with a multi-domain vertical alignment pixel structure. The fabricating method includes providing a substrate. A scan line, a data line and an active device are formed on the substrate, the scan line and the data line divide the substrate into a plurality of pixel regions, and the active device is electrically connected with the scan line and the data line. The first patterned pixel electrode is formed on the substrate and is electrically connected with the active device. A voltage drop layer is formed on the first patterned pixel electrode. A second patterned pixel electrode is formed on the voltage drop layer and is electrically connected with the active device. The first patterned pixel electrode and the second patterned pixel electrode are equipotential. The first patterned pixel electrode provides a first electrical field to the liquid crystal layer, and the second patterned pixel electrode provides a second electrical field to the liquid crystal layer. The voltage drop layer makes the first electrical field smaller than the second electrical field.

In an embodiment of the present invention, the voltage drop layer satisfies the following conditions:

$$\frac{\varepsilon_{pass}}{d_{pass}} \leq \frac{\varepsilon_{LC}}{d_{LC}} \times \left( \frac{|V_{0-gray} - V_{com}|}{B} - 1 \right),$$

$\in_{pass}$ is a dielectric constant of the voltage drop layer, $\in_{LC}$ is a dielectric constant of the liquid crystal layer, $d_{pass}$ is a thickness of the voltage drop layer, $d_{LC}$ is a thickness of the liquid crystal layer, $V_{0-gray}$ is a data voltage applied on the first patterned pixel electrode in a zero-gray-scale dark state, $V_{com}$ is a voltage applied on the common electrode, where $0.3 \leq B \leq 2$.

In an embodiment of the present invention, the voltage drop layer satisfies the following conditions:

$$\frac{\varepsilon_{pass}}{d_{pass}} \leq \frac{\varepsilon_{LC}}{d_{LC}} \times \left( \frac{|V_{0-gray} - V_{com}|}{B} - 1 \right),$$

$\in_{pass}$ is a dielectric constant of the voltage drop layer, $\in_{LC}$ is a dielectric constant of the liquid crystal layer, $d_{pass}$ is a thickness of the voltage drop layer, $d_{LC}$ is a thickness of the liquid crystal layer, $V_{0-gray}$ is a data voltage applied on the first patterned pixel electrode in a zero-gray-scale dark state, $V_{com}$ is a voltage applied on the common electrode, where B is 0.5.

In an embodiment of the present invention, a material of the voltage drop layer includes a high-molecular transparent insulation material.

In an embodiment of the present invention, the voltage drop layer has a multilayer film structure.

In an embodiment of the present invention, the fabricating method of the multi-domain vertical alignment pixel structure further includes: forming a storage capacitance electrode between two adjacent scan lines on the substrate.

In an embodiment of the present invention, the active device of the multi-domain vertical alignment pixel structure includes a gate, a source and a drain. The gate is electrically connected with the scan line, the source is electrically connected with the data line, and the drain is electrically connected with the first and the second patterned pixel electrodes.

In an embodiment of the present invention, the fabricating method of the multi-domain vertical alignment pixel structure includes forming at least one contact window opening in the voltage drop layer, and the second patterned pixel electrode is electrically connected with the first patterned pixel electrode through the contact window opening.

In an embodiment of the present invention, the first patterned pixel electrode in the multi-domain vertical alignment pixel structure includes a first complete coverage area and at least one slit distribution area. A plurality of liquid crystal molecules of the liquid crystal layer has a plurality of inclining directions, in which the first complete coverage area is disposed at an inclining center of the inclining directions of the liquid crystal molecules, and the slit distribution area stabilizes the inclining directions of the liquid crystal molecules.

In an embodiment of the present invention, the second patterned pixel electrode in the multi-domain vertical alignment pixel structure includes a second complete coverage area and at least one slit distribution area. The slit distribution area is radially distributed outwards from a center of the second complete coverage area.

In an embodiment of the present invention, the fabricating method of the multi-domain vertical alignment pixel structure further includes forming a color filter layer above the common electrode.

As broadly described and embodied herein, a second invention of the present invention is a substrate with a multi-domain vertical alignment pixel structure. The substrate includes a scan line and a data line, a first active device, a second active device, a first patterned pixel electrode, a passivation layer and a second patterned pixel electrode. The first active device is electrically connected with the corresponding scan line and data line. The second active device is electrically connected with the corresponding scan line and data line. The first patterned pixel electrode is electrically connected with the first active device, and the first patterned pixel electrode has a plurality of first strip electrodes. The passivation layer (the SiN layer $L_{SiN}$) is disposed on the first patterned pixel electrode. The second patterned pixel electrode is electrically connected with the second active device, and the second patterned pixel electrode has a plurality of second strip electrodes. The first strip electrode and the second strip electrode are partially overlapped, and the second strip electrode is shifted for a predetermined distance from the first strip electrode.

In an embodiment of the present invention, the predetermined distance is ranging from 0.1 µm to 2.5 µm, and preferably is ranging from 0.5 µm to 1.5 µm.

In an embodiment of the present invention, a total width after each of the first strip electrodes and each of the second strip electrodes are overlapped is ranging from 3.6 µm to 6 µm, and preferably is ranging from 4 µm to 5 µm.

The present invention also provides a liquid crystal display panel and liquid crystal display with the substrate of the second invention.

As broadly described and embodied herein, a third invention of the present invention is a substrate with a multi-domain vertical alignment pixel structure. The substrate includes a scan line and a data line, a first active device, a second active device, a patterned pixel electrode, a biased electrode and a passivation layer. The first active device is electrically connected with the corresponding scan line and data line. The second active device is electrically connected with the corresponding scan line and data line. The patterned pixel electrode has a first region and a second region. The first region is electrically connected with the first active device, the second region is electrically connected with the second active device, and the first region and the second region have a boundary region therebetween. The biased electrode is corresponding to the boundary region. The passivation layer is sandwiched between the biased electrode and the patterned pixel electrode.

In the substrate with a multi-domain vertical alignment pixel structure according to an embodiment of the present invention, an edge of the biased electrode is at a predetermined interval from an edge of the patterned pixel electrode of the second region in the direction from the second region to the first region.

In an embodiment of the present invention, the predetermined interval is ranging from 0 µm to 1 µm.

In an embodiment of the present invention, a material of the biased electrode includes a metal.

In an embodiment of the present invention, a material of the biased electrode includes a transparent conductive material.

The present invention also provides a liquid crystal display panel and a liquid crystal display with the substrate of the third invention.

As described above, in the substrate with a multi-domain vertical alignment pixel structure of the present invention, the design of the voltage drop layer or the slit configuration of the patterned pixel electrode may achieve a display effect of low color shift and less dark fringe. The liquid crystal display panel and the liquid crystal display of the present invention have the above substrate with a multi-domain vertical alignment pixel structure, so the liquid crystal display panel and the liquid crystal display provide a good display quality. Furthermore, according to the fabricating method of the substrate with a multi-domain vertical alignment pixel structure of, the present invention, the multi-domain vertical alignment pixel structure having a low color shift effect and less dark fringes can be fabricated by a simple processing flow.

Several exemplary embodiments accompanied with figures are described in detail below to further describe the disclosure in details.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

Figure 1:
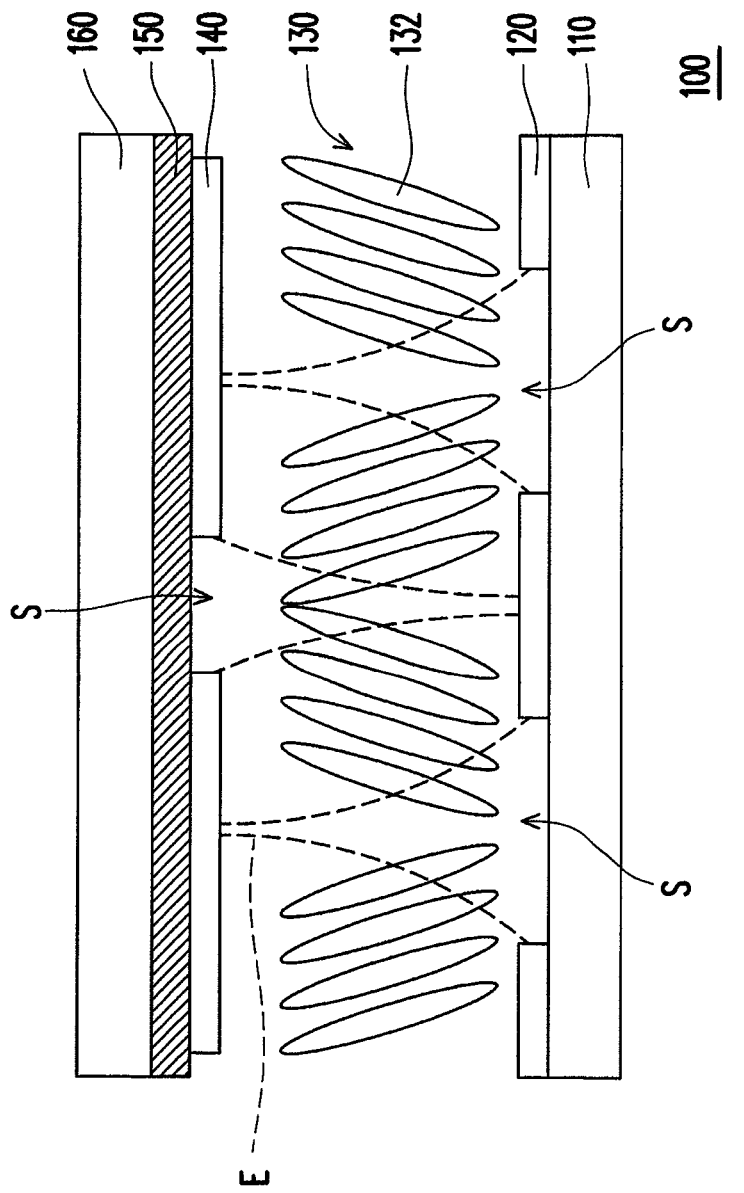
FIG. 1 is a schematic cross-sectional view of a multi-domain vertical alignment liquid crystal display panel in the prior art.
Figure 2A:
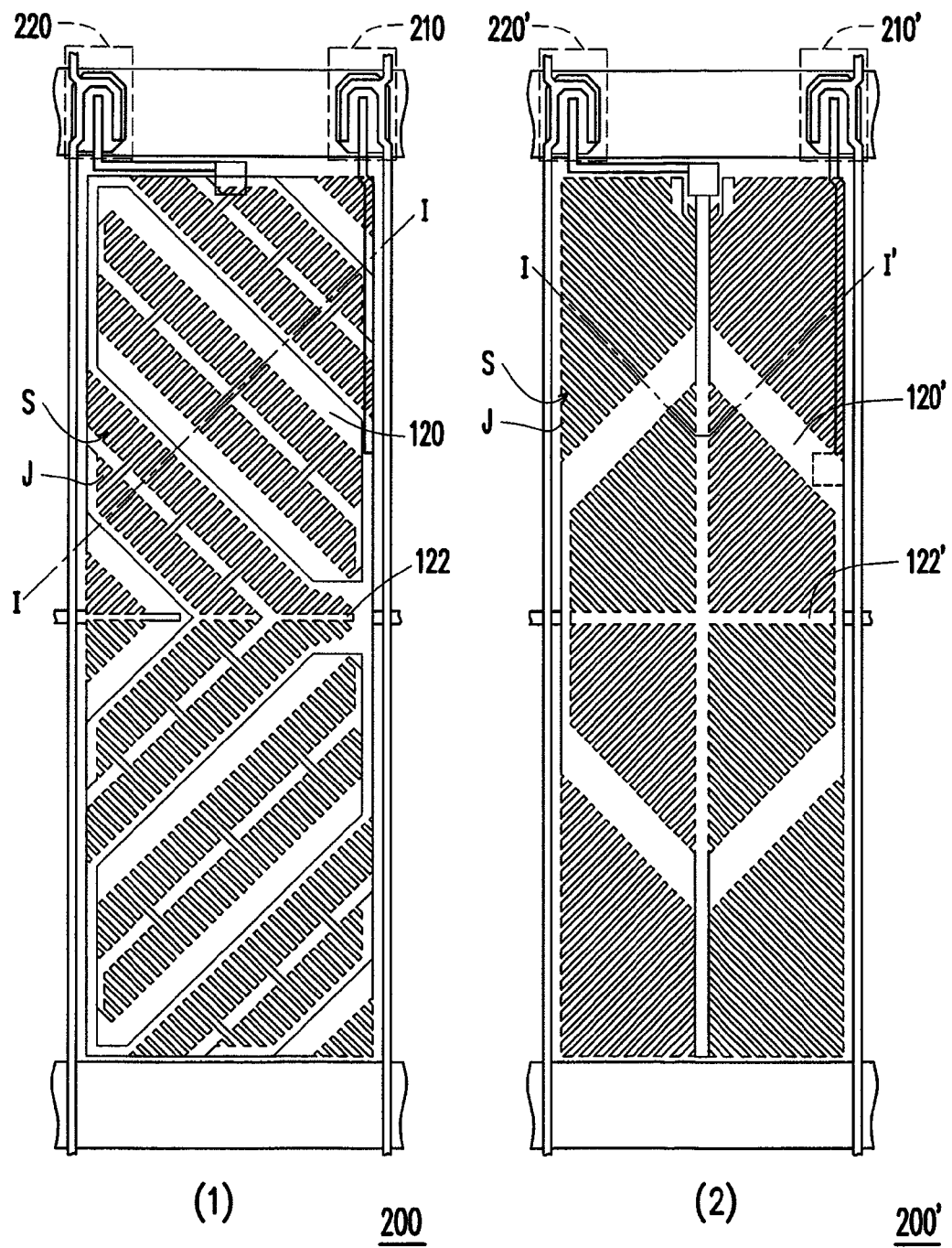
Figure 2B:
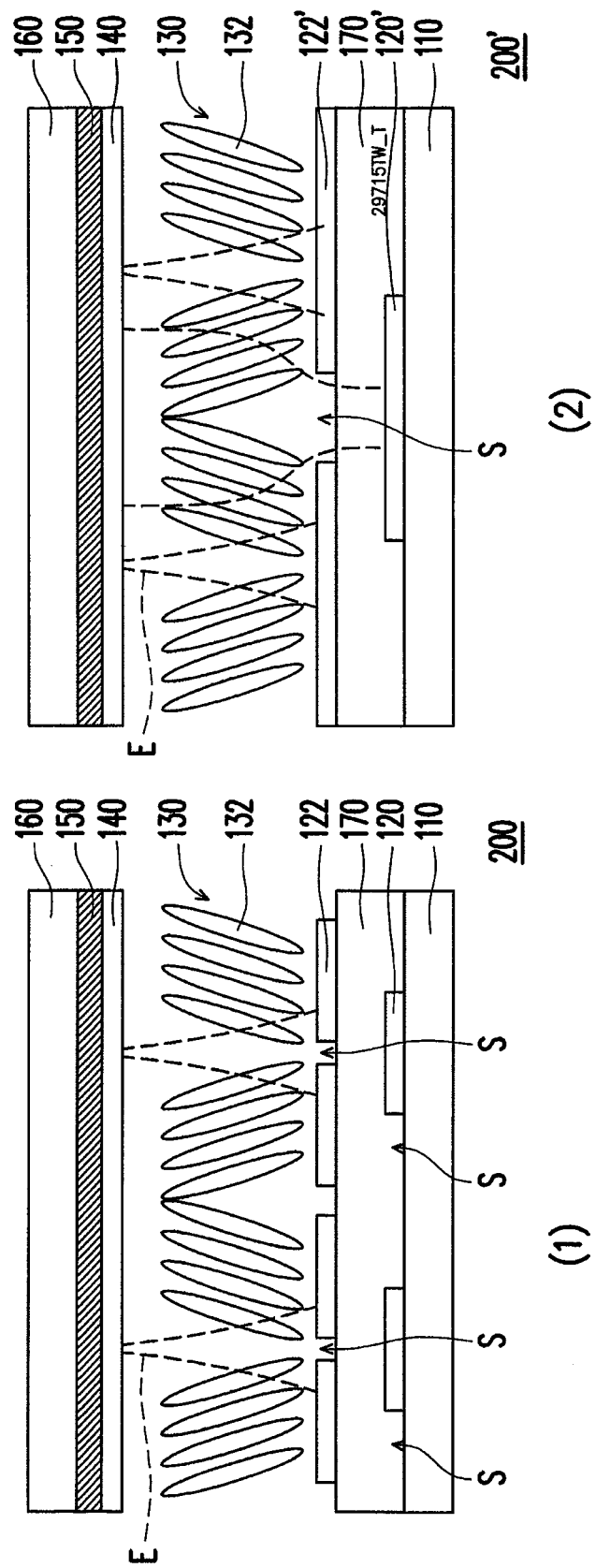
Figure 2C:
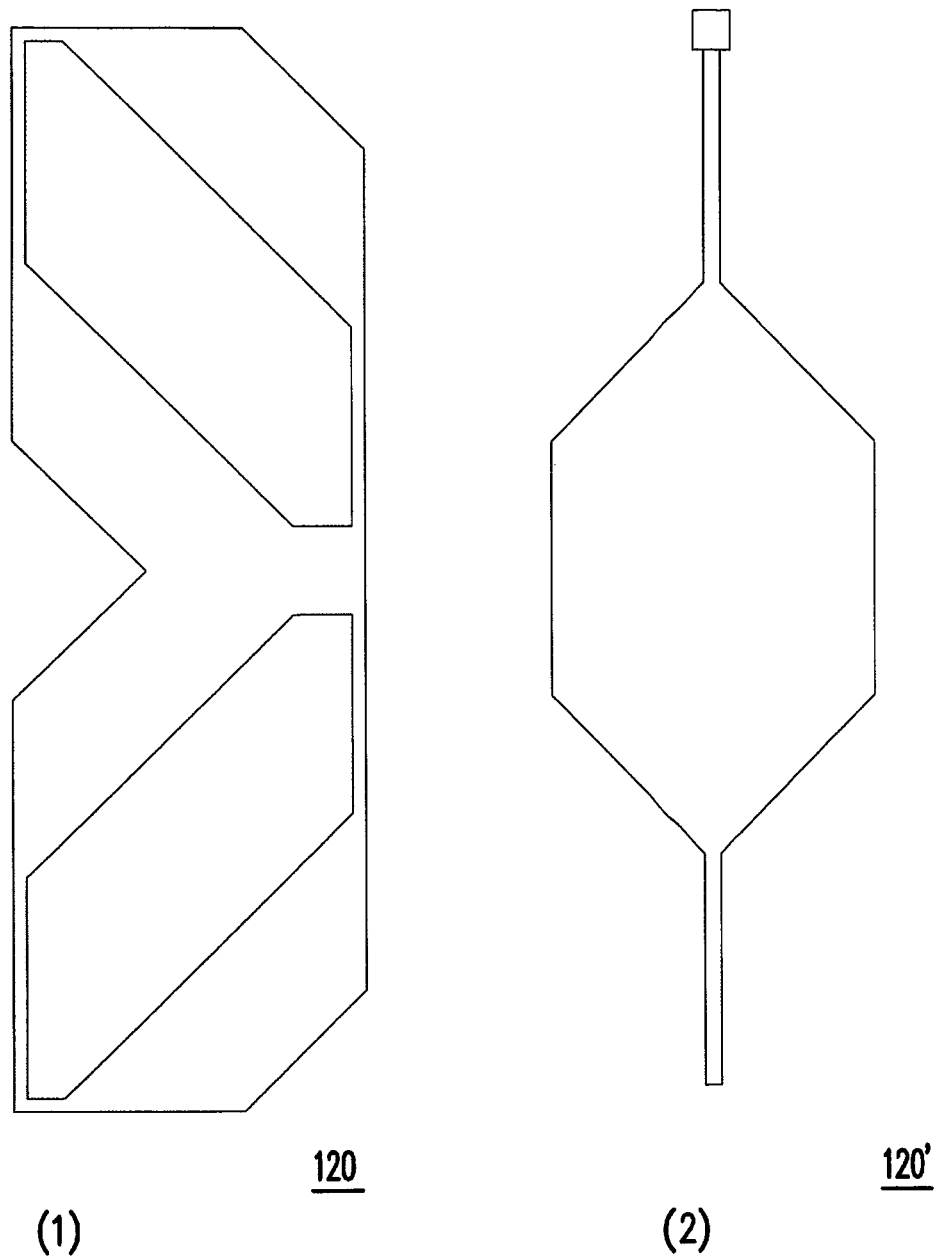
Figure 2D:
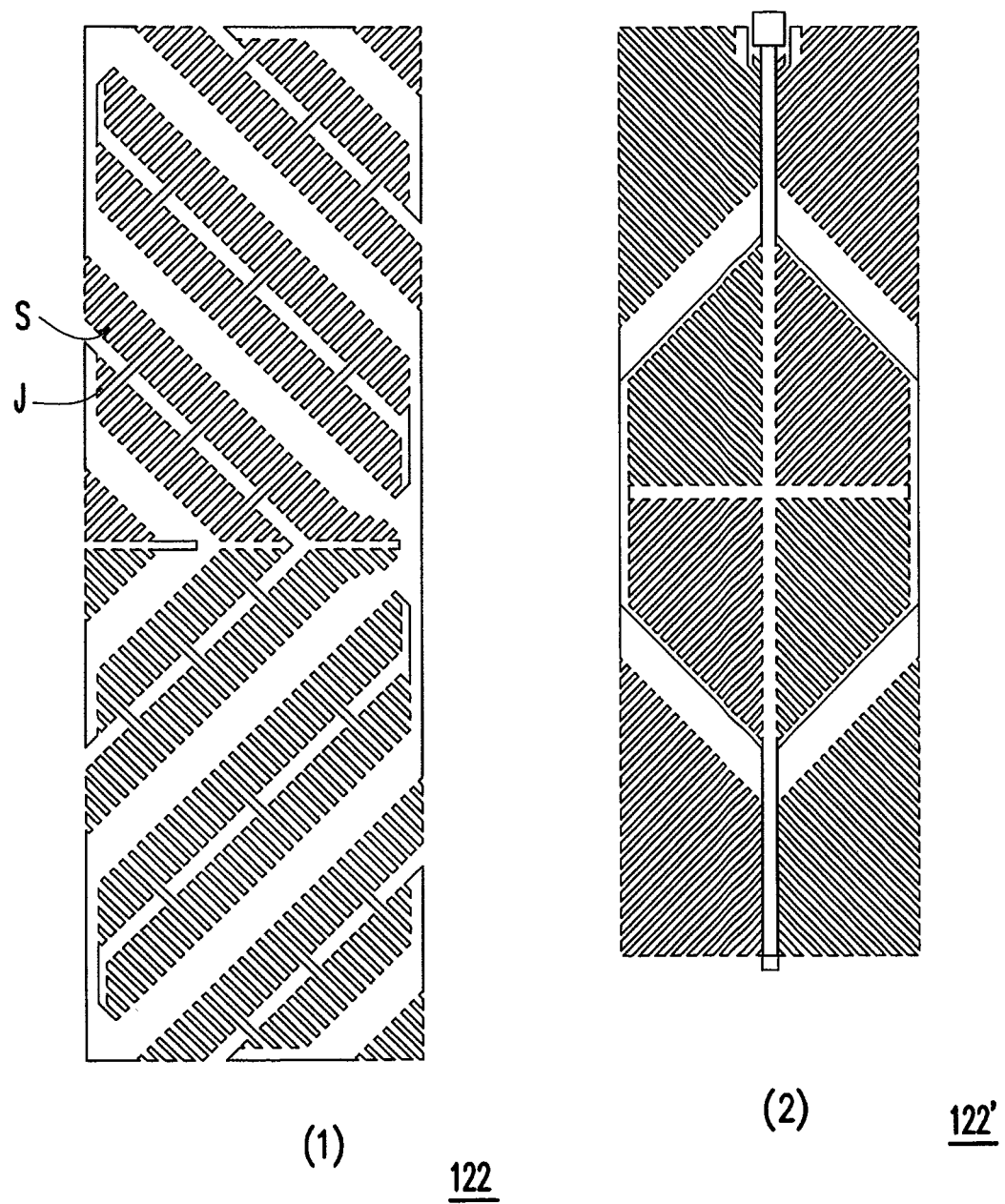
Figure 3:
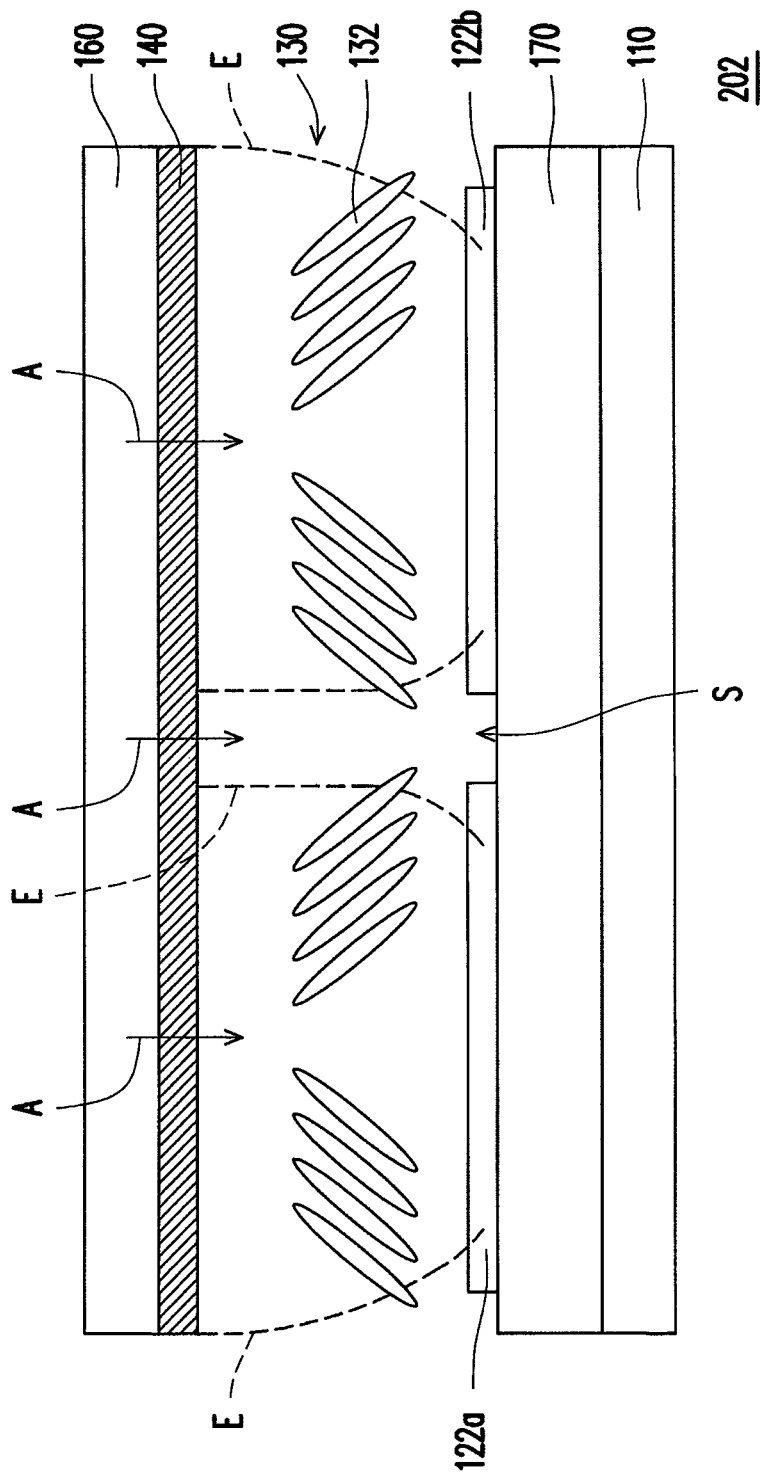
Figure 4:
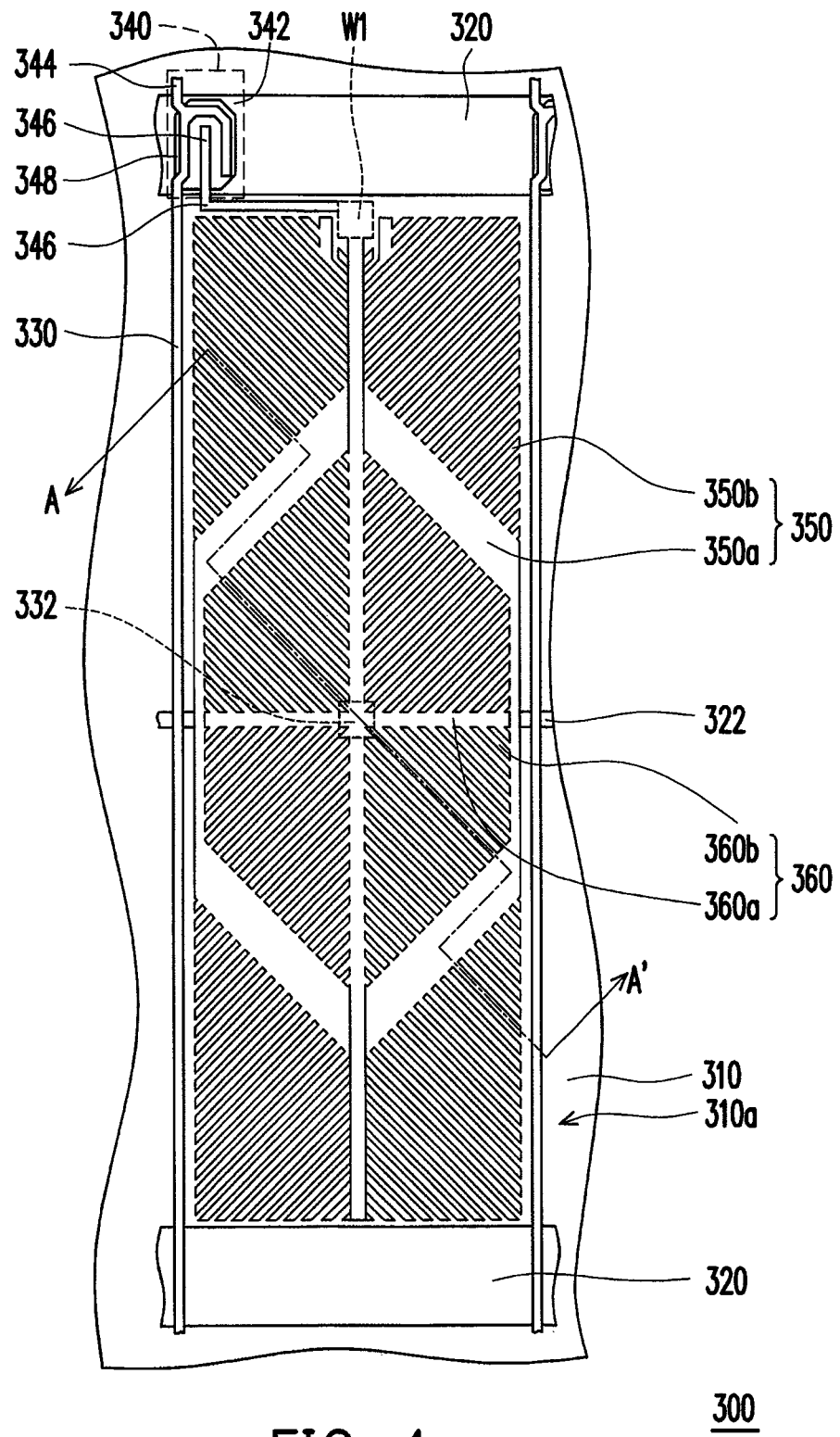
Figure 6A:
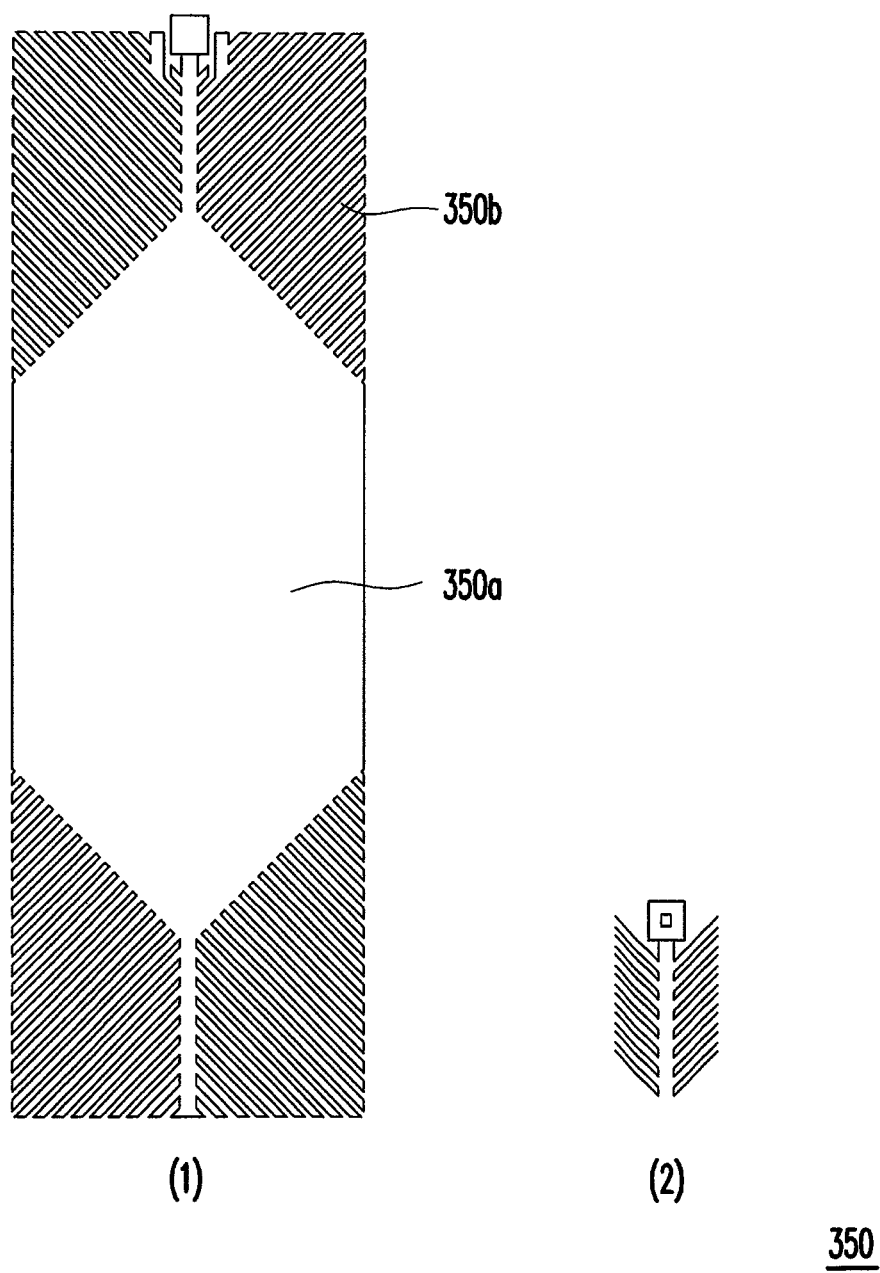
Figure 6B:
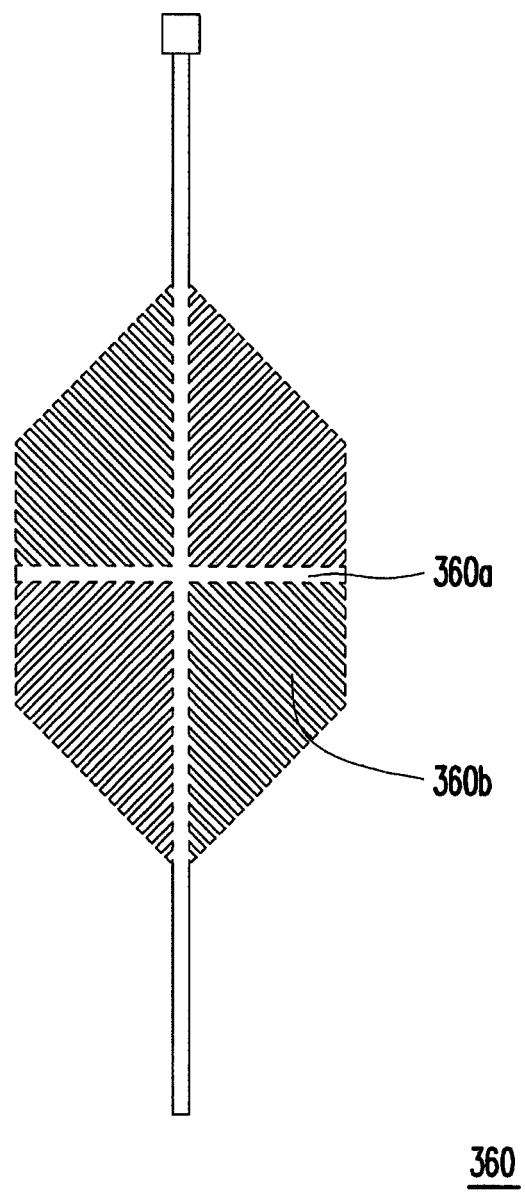
Figure 7:
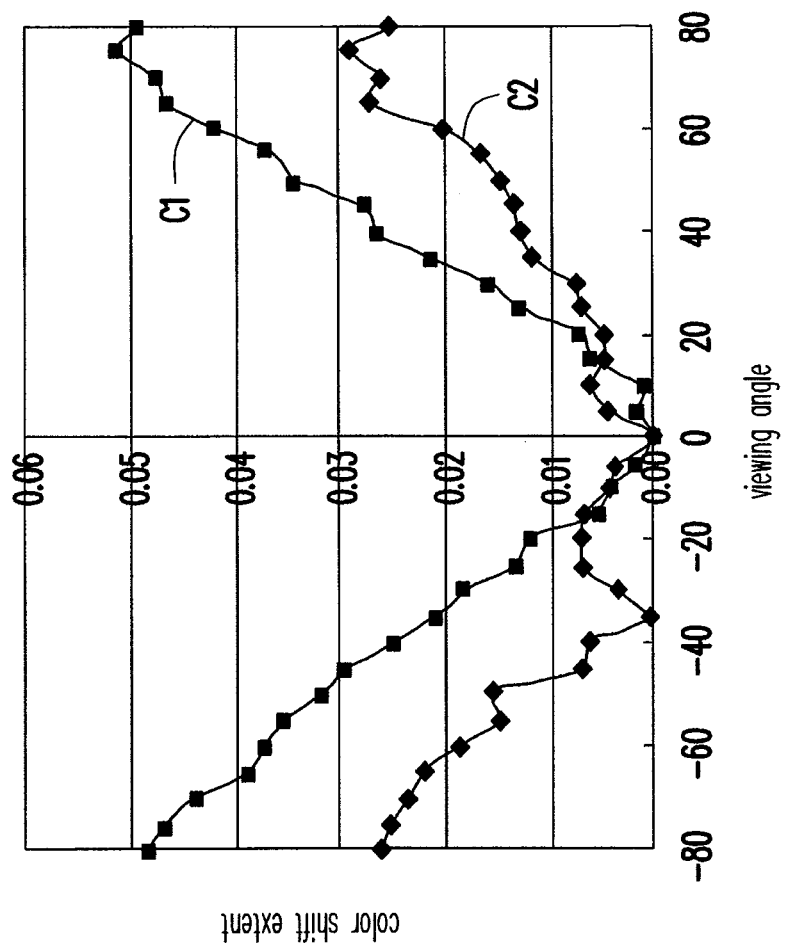
Figure 8:
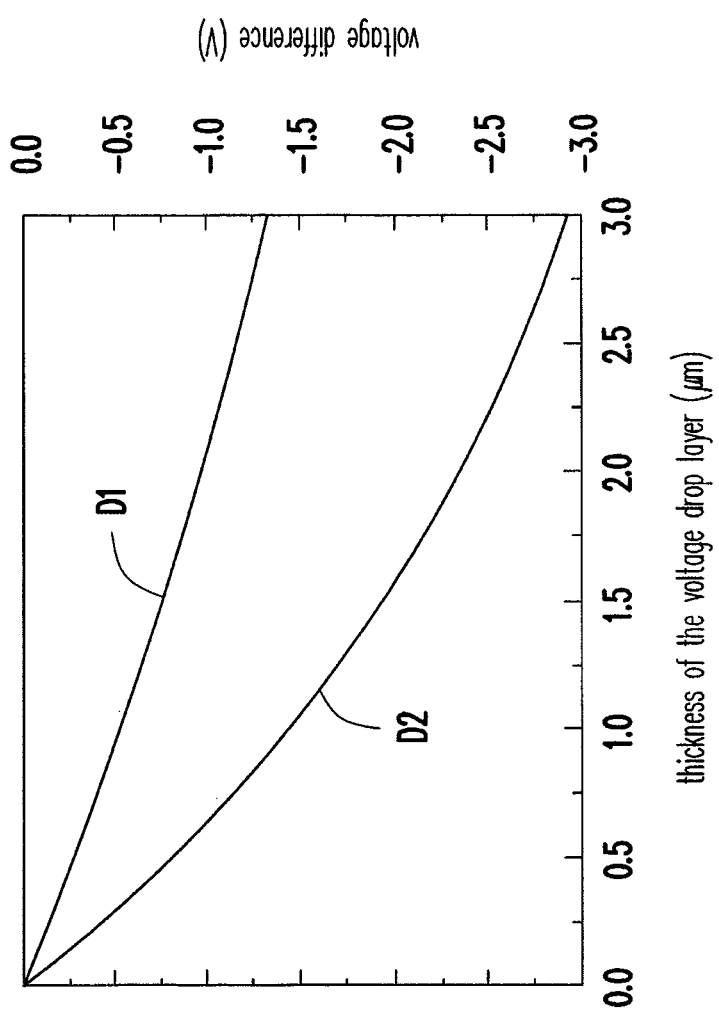
Figure 9A:
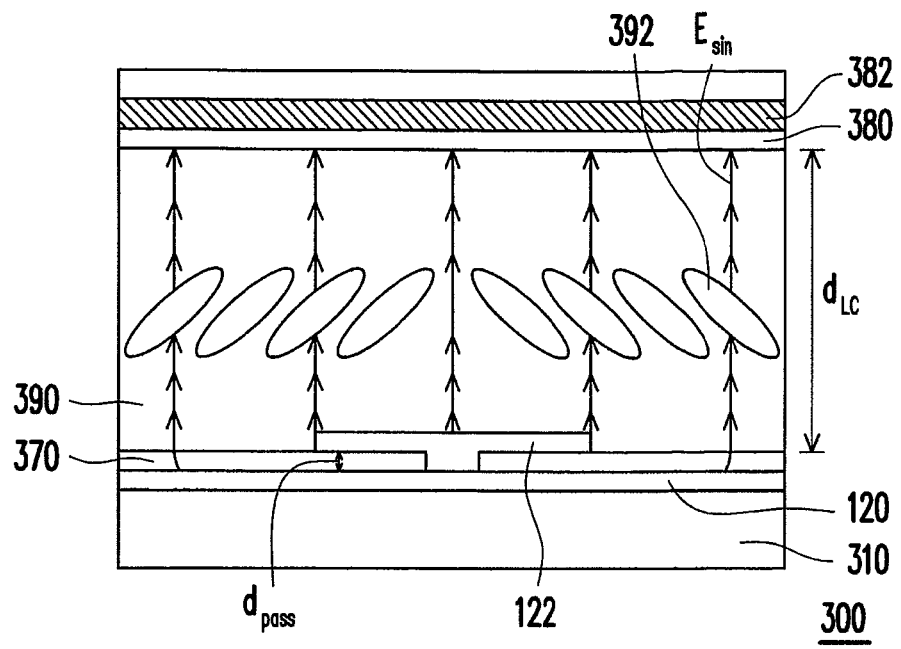
Figure 9B:
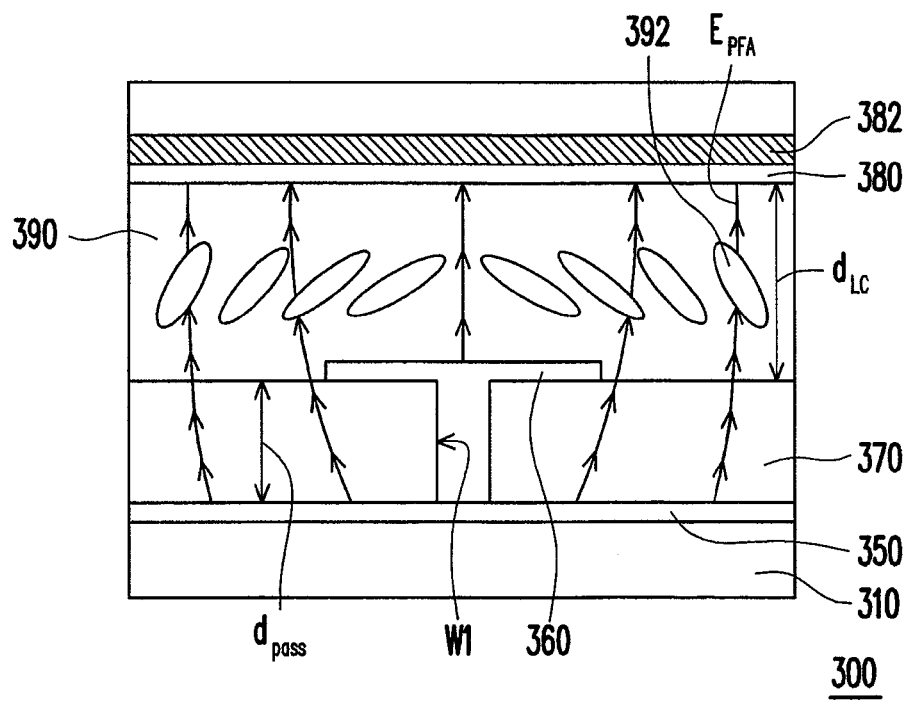
Figure 10:
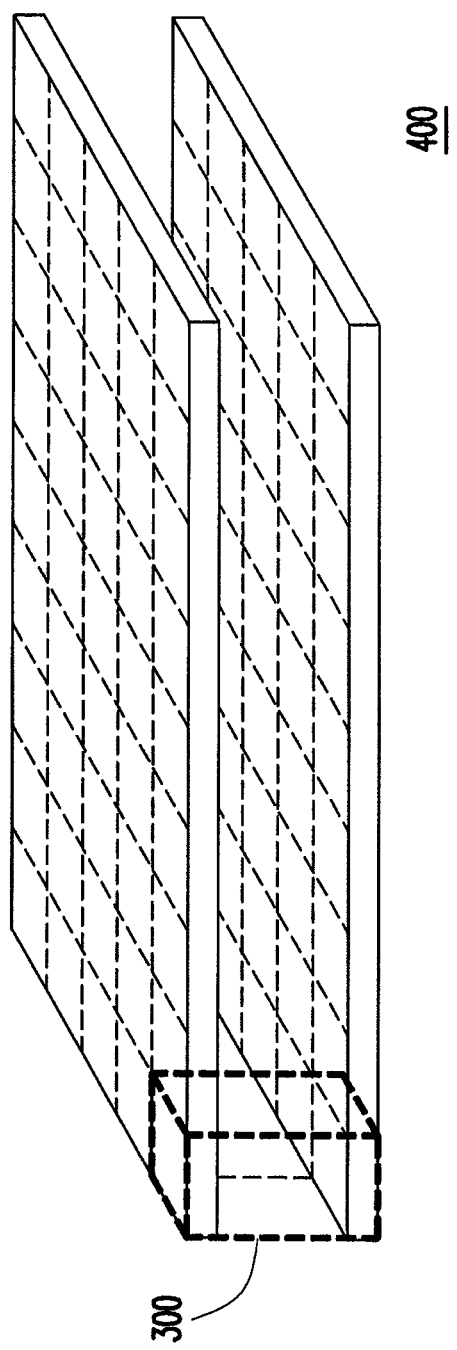
Figure 11:
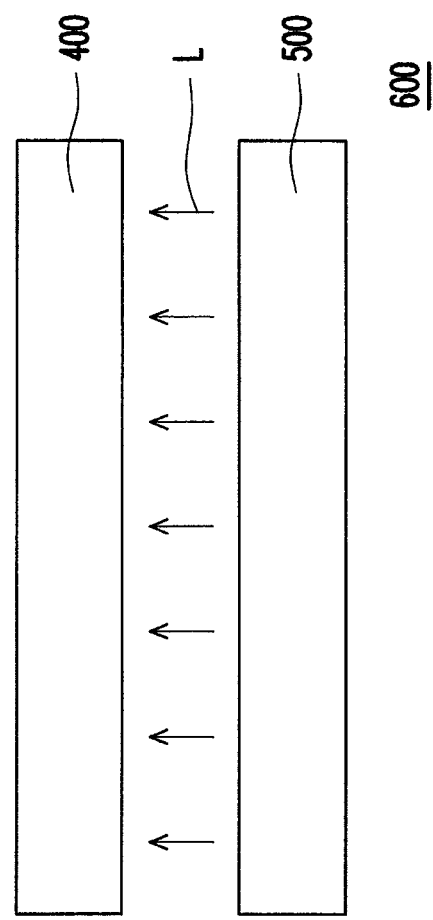
Figure 13A:
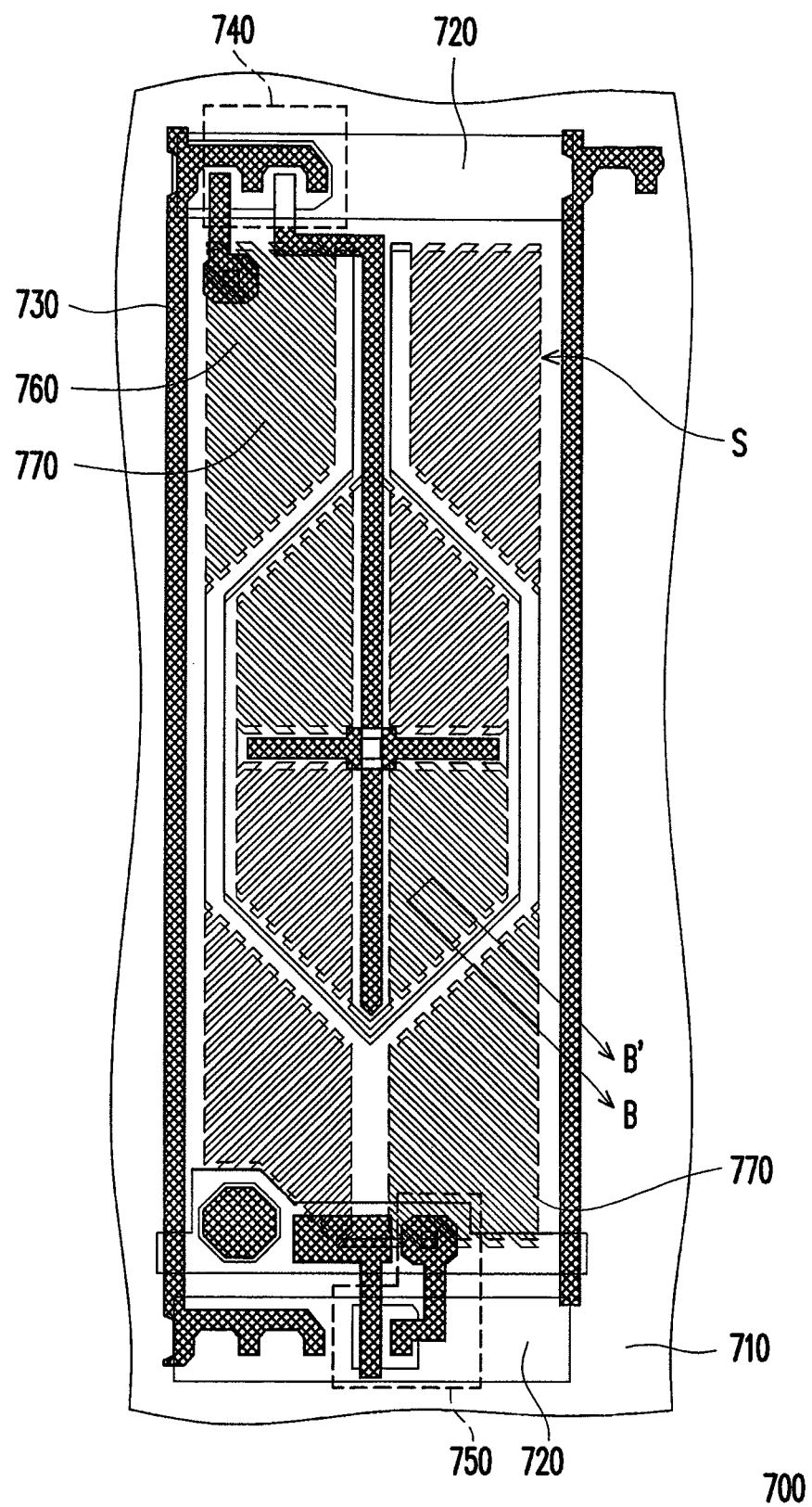
Figure 13B:
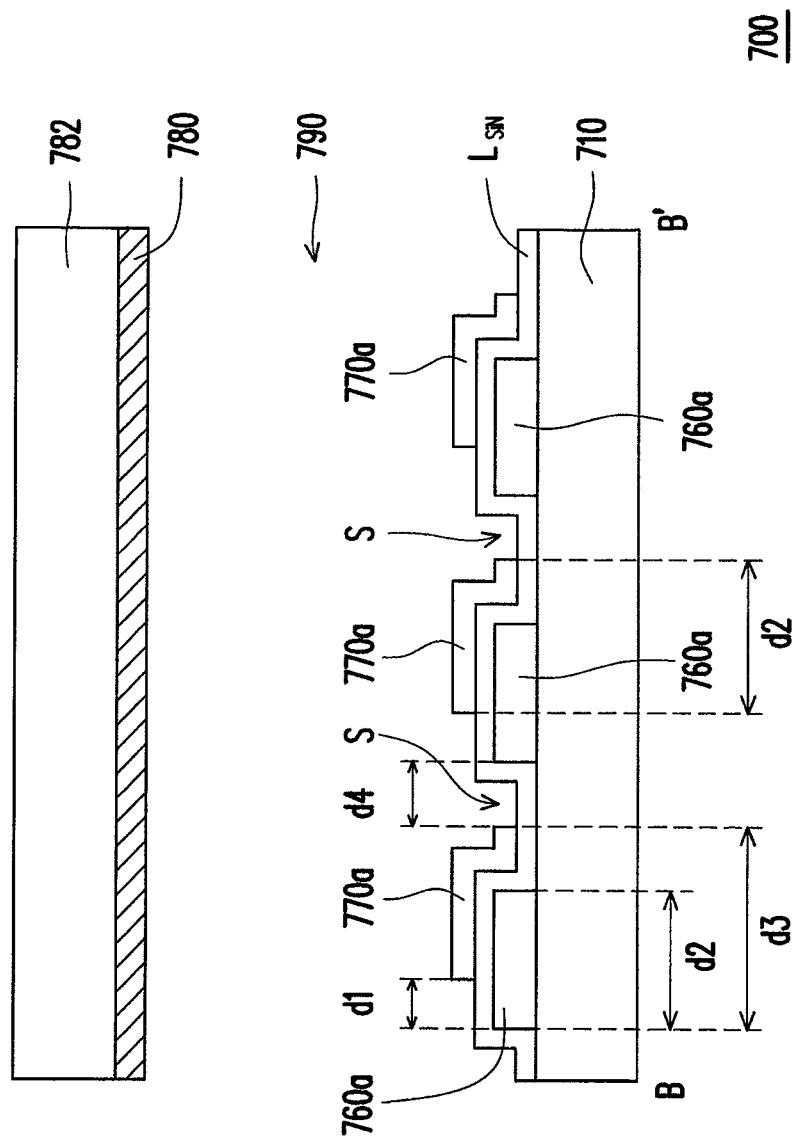
Figure 14A:
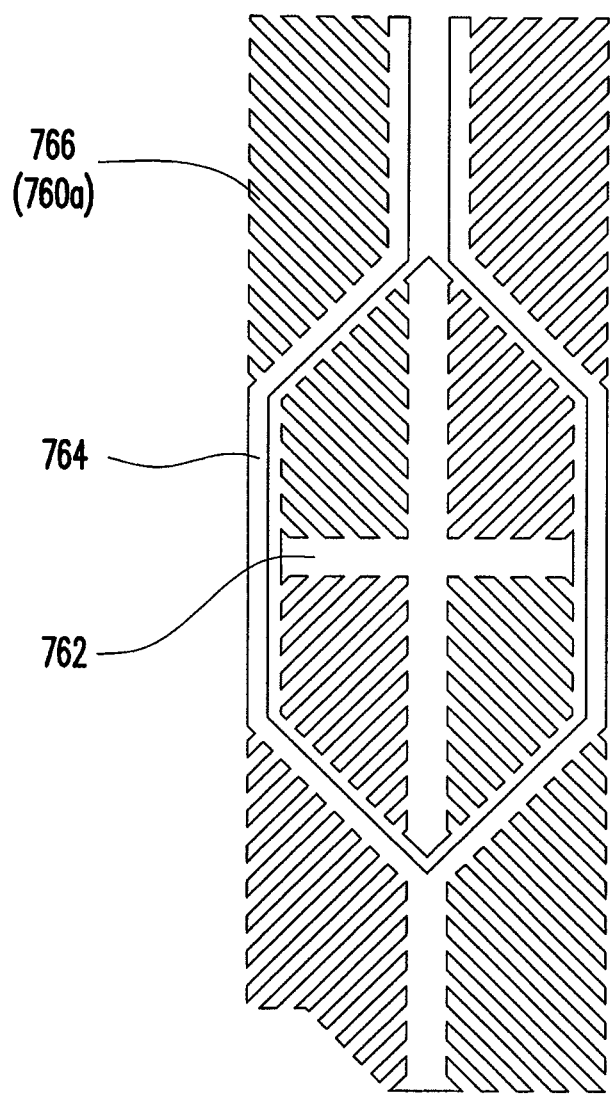
Figure 14B:
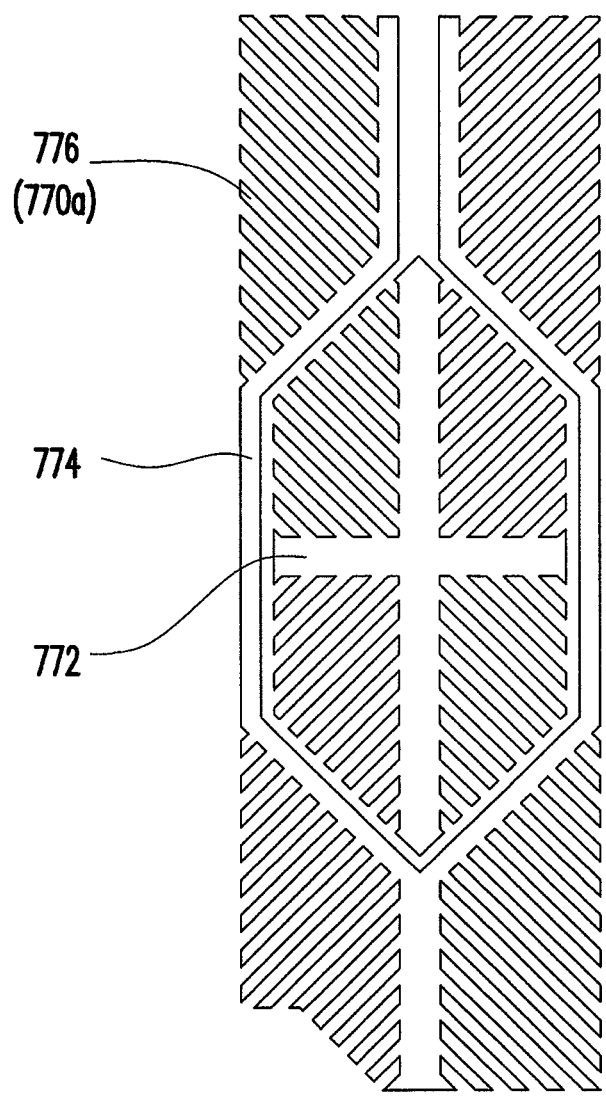
Figure 15A:
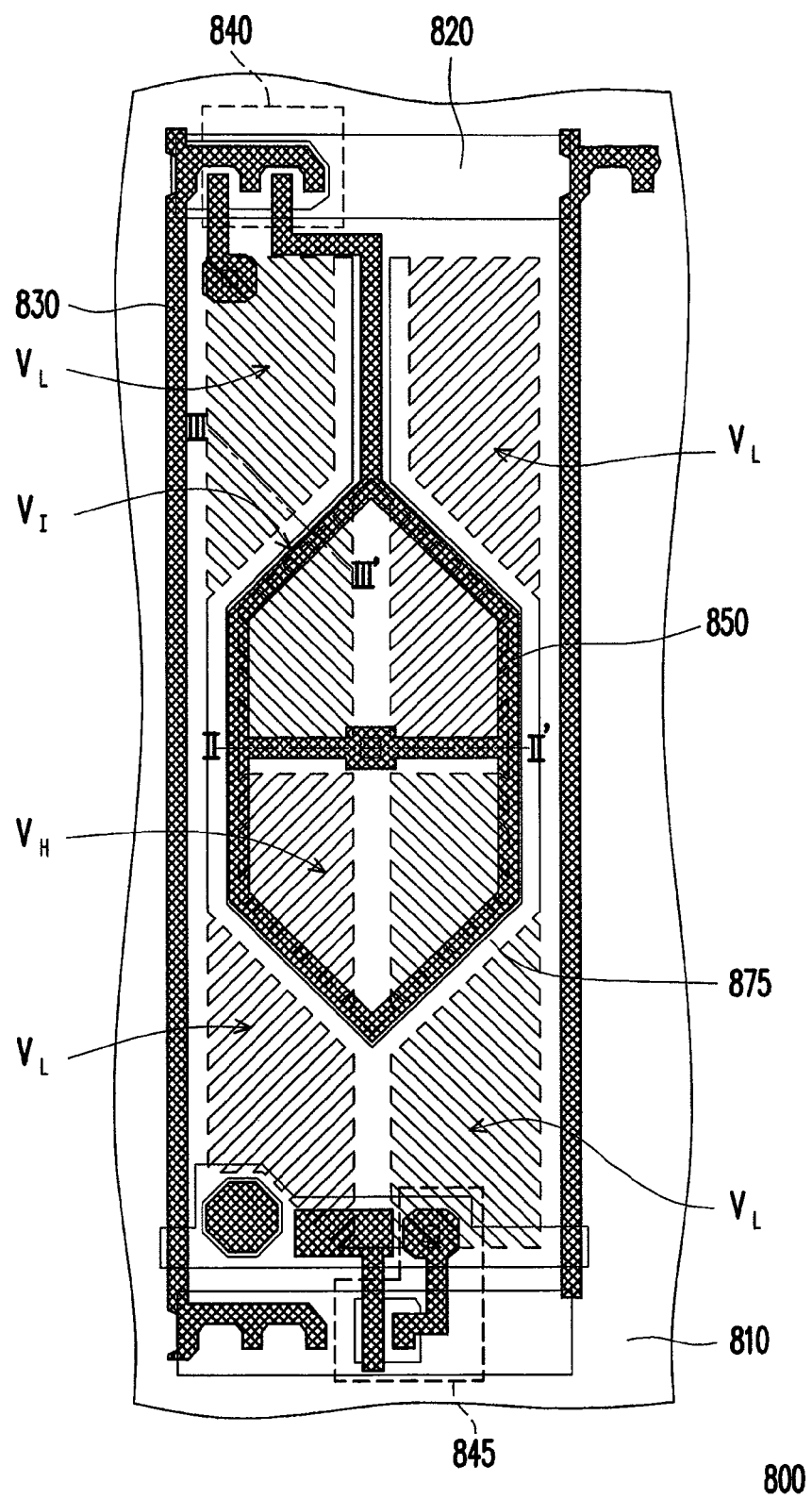
Figure 15B:
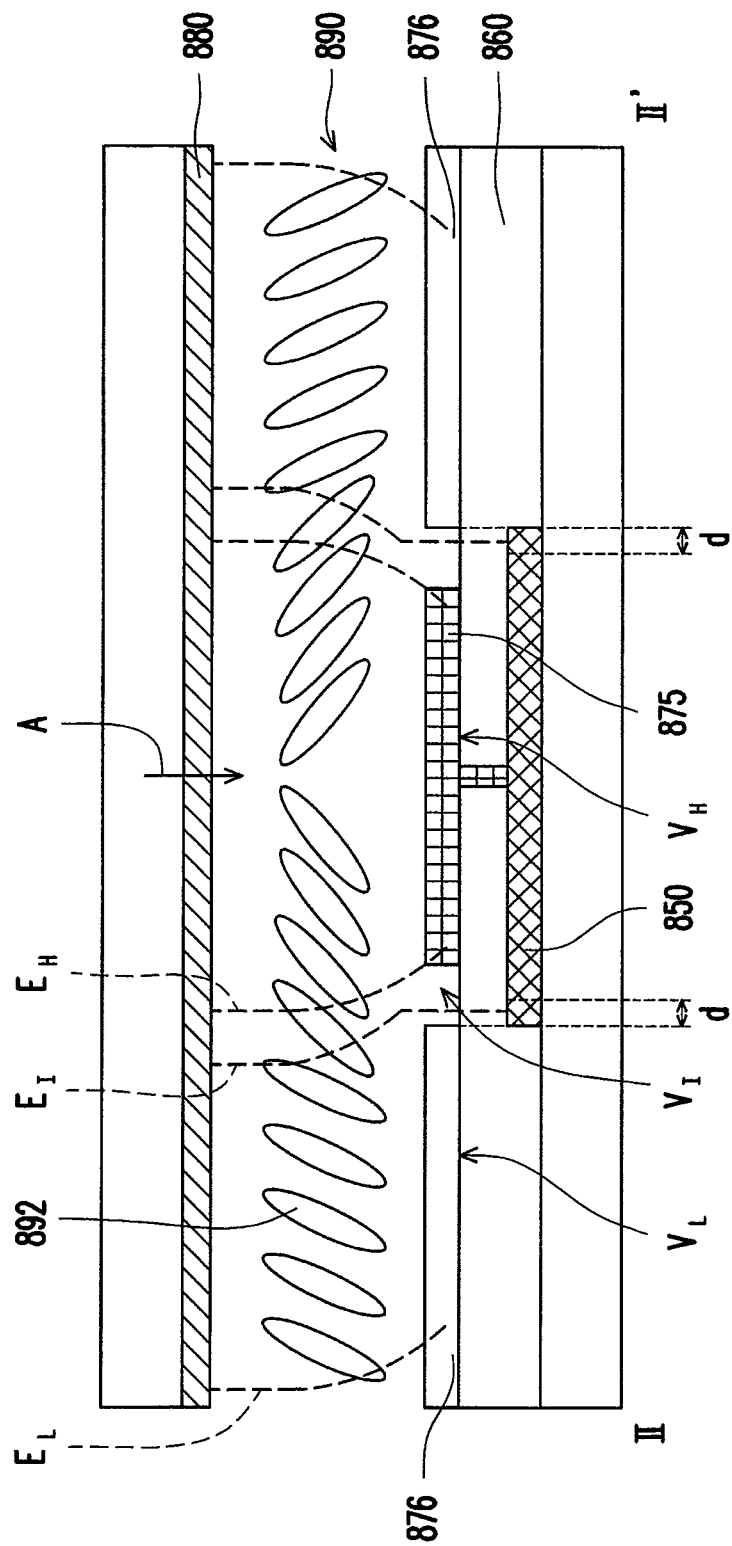
Figure 15C:
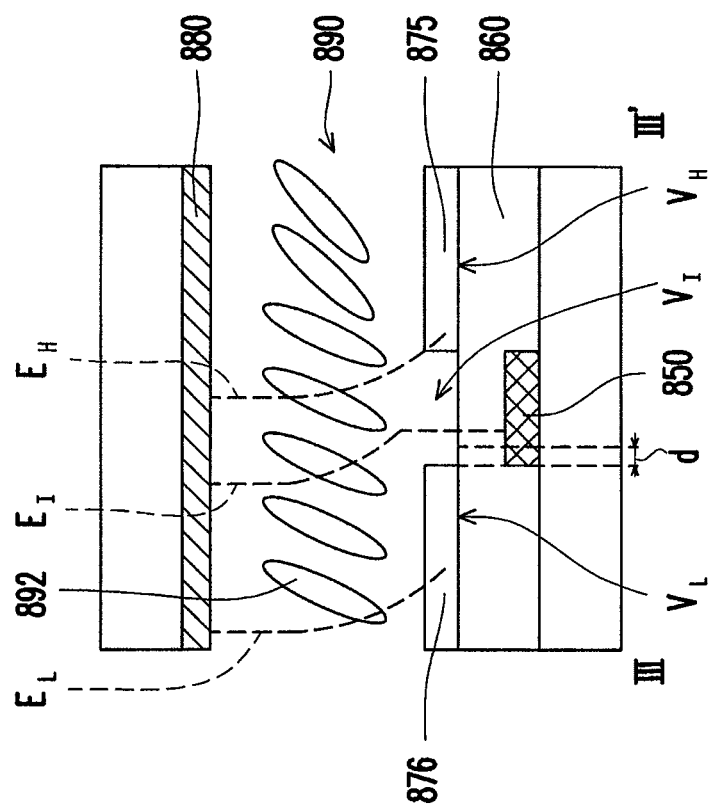
Figure 16A:
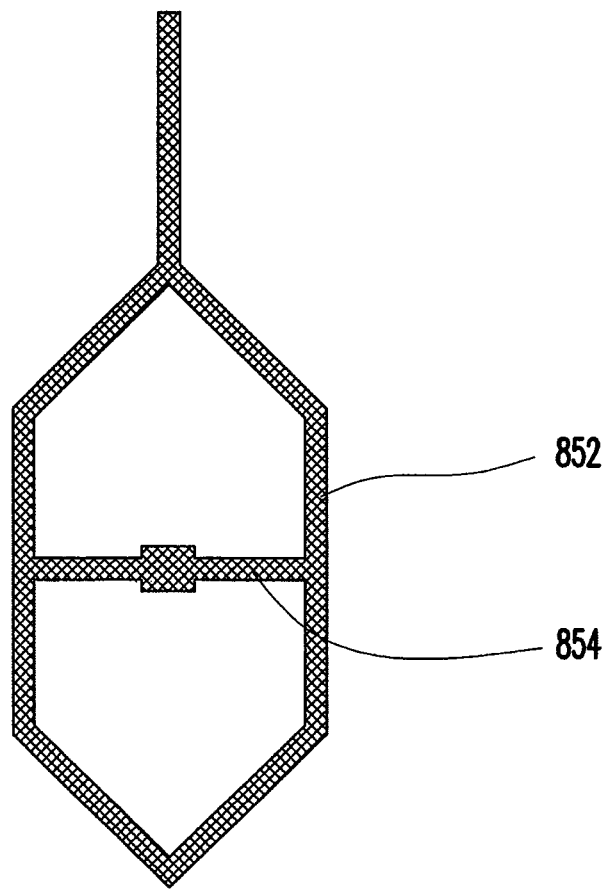
Figure 16B:
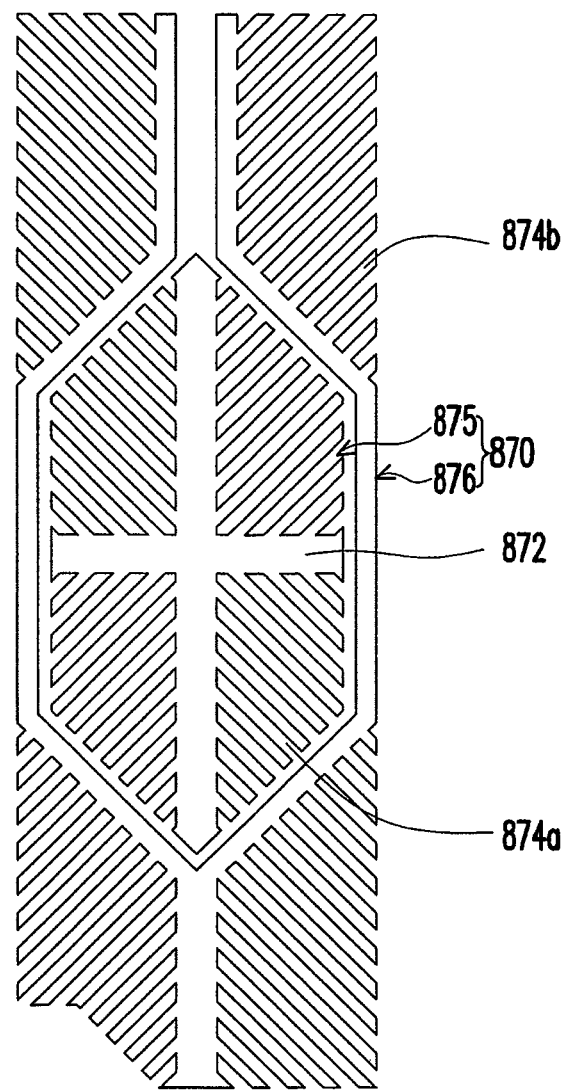

FIG. (1) and FIG. (2) of FIG. 2A are schematic top views of two multi-domain vertical alignment liquid crystal display panels in the prior art respectively;

FIG. (1) and FIG. (2) of FIG. 2B are schematic cross-sectional views of the multi-domain vertical alignment liquid crystal display panel in FIG. (1) and FIG. (2) of FIG. 2A taken along Line I-I' respectively;

FIG. (1) and FIG. (2) of FIG. 2C are schematic top views of pixel electrodes 120, 120' of the multi-domain vertical alignment liquid crystal display panel in FIG. (1) and FIG. (2) of FIG. 2A respectively;

FIG. (1) and FIG. (2) of FIG. 2D are schematic top views of pixel electrodes 122, 122' of the multi-domain vertical alignment liquid crystal display panel in FIG. (1) and FIG. (2) of FIG. 2A respectively;

FIG. 3 is a schematic cross-sectional view of another multi-domain vertical alignment liquid crystal display panel in the prior art;

FIG. 4 is a schematic top view of a substrate with a multi-domain vertical alignment pixel structure according to an exemplary embodiment of the present invention;

FIG. 5A is a schematic cross-sectional view of the multi-domain vertical alignment pixel structure in FIG. 4 taken along Line A-A';

FIG. 5B is an equivalent circuit diagram of films applied with a voltage in FIG. 5A;

FIG. 6A is a schematic top view of a first patterned pixel electrode according to an exemplary embodiment of the present invention;

FIG. 6B is a schematic top view of a second patterned pixel electrode according to an exemplary embodiment of the present invention;

FIG. 7 is a curve diagram of a color shift extent changing with a viewing angle under different voltage differences;

FIG. 8 is a curve diagram of a voltage difference verses a thickness when a different materials of the voltage drop layer are selected;

FIG. 9A is a schematic view of liquid crystal molecules influenced by an electrical field when the material of the voltage drop layer is SiN;

FIG. 9B is a schematic view of liquid crystal molecules influenced by an electrical field when the material of the voltage drop layer is a high-molecular transparent insulation material;

FIG. 10 is a schematic three-dimensional view of a liquid crystal display panel according to an exemplary embodiment of the present invention;

FIG. 11 is a schematic view of a liquid crystal display according to an exemplary embodiment of the present invention;

FIG. 12A to FIG. 12E are schematic views of a part of processing flows of a fabricating method of a substrate with a multi-domain vertical alignment pixel structure according to an exemplary embodiment of the present invention;

FIG. 13A is a schematic top view of another substrate with a multi-domain vertical alignment pixel structure according to an exemplary embodiment of the present invention;

FIG. 13B is a schematic cross-sectional view of the multi-domain vertical alignment pixel structure in FIG. 13A taken along Line B-B';

FIG. 14A is a schematic top view of a first patterned pixel electrode of the multi-domain vertical alignment pixel structure in FIG. 13A;

FIG. 14B is a schematic top view of a second patterned pixel electrode of the multi-domain vertical alignment pixel structure in FIG. 13A;

FIG. 15A is a schematic top view of still another substrate with a multi-domain vertical alignment pixel structure according to an exemplary embodiment of the present invention;

FIG. 15B is a schematic cross-sectional view of the multi-domain vertical alignment pixel structure in FIG. 15A taken along Line II-II';

FIG. 15C is a schematic cross-sectional view of the multi-domain vertical alignment pixel structure in FIG. 15A taken along Line III-III';

FIG. 16A is a schematic top view of a biased electrode of the substrate with a multi-domain vertical alignment pixel structure in FIG. 15A; and FIG. 16B is a schematic top view of a patterned pixel electrode of the substrate with a multi-domain vertical alignment pixel structure in FIG. 15A.

DESCRIPTION OF THE EMBODIMENTS

Reference will now be made in detail to the present embodiments of the invention, examples of which are illustrated in the accompanying drawings. Wherever possible, the same reference numbers are used in the drawings and the description to refer to the same or like parts.

The First Embodiment

FIG. 4 is a schematic top view of a substrate with a multi-domain vertical alignment pixel structure according to an exemplary embodiment of the present invention. FIG. 5A is a schematic cross-sectional view of the multi-domain vertical alignment pixel structure in FIG. 4 taken along Line A-A'. FIG. 5B is an equivalent circuit diagram of films applied with a voltage in FIG. 5A.

Referring to FIG. 4, FIG. 5A and FIG. 5B together, the substrate 310 having multi-domain vertical alignment pixel structure 300 is opposite to has a counter substrate 384 having a common electrode 380, and a liquid crystal layer 390 is disposed between the substrate 310 and the counter substrate 384. The substrate 310 includes a scan line 320, a data line 330, an active device 340, a first patterned pixel electrode 350, a voltage drop layer 370 and a second patterned pixel electrode 360. The scan line 320 and the data line 330 divide the substrate 310 into a plurality of pixel regions 310a. The active device 340 is electrically connected with the scan line 320 and the data line 330. The first patterned pixel electrode 350 is electrically connected with the active device 340. The voltage drop layer 370 is disposed above the first patterned pixel electrode 350. The second patterned pixel electrode 360 is disposed above the first patterned pixel electrode 350 and is electrically connected with the active device 340, in which the first patterned pixel electrode 350 and the second patterned pixel electrode 360 are equipotential. The first patterned pixel electrode 350 provides a first electrical field to the liquid crystal layer 390, the second patterned pixel electrode 360 provides a second electrical field to the liquid crystal layer 390, and the voltage drop layer 370 makes the first electrical field smaller than the second electrical field.

In an embodiment, voltage drop layer 370 may satisfy the following conditions:

$$\frac{\varepsilon_{pass}}{d_{pass}} \leq \frac{\varepsilon_{LC}}{d_{LC}} \times \left( \frac{|V_{0-gray} - V_{com}|}{B} - 1 \right), \quad (1)$$

$\varepsilon_{pass}$ is a dielectric constant of the voltage drop layer 370, $\varepsilon_{LC}$ is a dielectric constant of the liquid crystal layer 390, $d_{pass}$ is a thickness of the voltage drop layer 370, $d_{LC}$ is a thickness of the liquid crystal layer 390, $V_{0-gray}$ is a data voltage applied on the first patterned pixel electrode 350 in a zero-gray-scale dark state, $V_{com}$ is a voltage applied on the common electrode 380, where B is a constant and $0.3 \leq B \leq 2$, or in another embodiment, B is 0.5.

Referring to FIG. 4, FIG. 5A and FIG. 5B, the active device 340 may includes a gate 342, a source 344 and a drain 346. The gate 342 is electrically connected with the scan line 320, and the source 344 is electrically connected with the drain 346 and the data line 330. In particular, the active device 340 further has a channel layer 348, so that electrons move in the channel layer 348. The active device 340 is for example a three-terminal switch device like a thin-film transistor, for applying a data voltage from the data line 330 to the first and the second patterned pixel electrodes 350, 360.

In addition, the substrate 310 with the multi-domain vertical alignment pixel structure 300 of FIG. 4 may further include a storage capacitance electrode 322 disposed on the substrate 310 and between two adjacent scan lines 320. The storage capacitance electrode 322 generally is fabricated by a first mask process which is same as that of the scan line 320. The storage capacitance electrode 322, a gate insulating layer (not shown) disposed on the storage capacitance electrode 322 and a second metal electrode 332 may form a storage capacitance (Cst), such that the display of the multi-domain vertical alignment pixel structure 300 may maintain a long time. The second metal electrode 332 is, for example, fabricated by a second mask process which is the same as that of the data line 330.

FIG. 6A is a schematic top view of a first patterned pixel electrode according to an exemplary embodiment of the present invention. FIG. 6B is a schematic top view of a second patterned pixel electrode according to an exemplary embodiment of the present invention. Referring to FIG. 4, FIG. 5A and FIG. 6A firstly, the first patterned pixel electrode 350 may include a first region 350a and at least one slit distribution area 350b. In one embodiment, the first region 350a is a complete coverage area. A plurality of liquid crystal molecules 392 of the liquid crystal layer 390 has a plurality of inclining directions, in which the first region 350a is disposed at an inclining center of the inclining directions of the liquid crystal molecules 392, and the slit distribution area 350b stabilizes the inclining directions of the liquid crystal molecules 392. Then, referring to FIG. 4, FIG. 5A and FIG. 6B, the second patterned pixel electrode 360 may include a second complete coverage area 360a and at least one slit distribution area 360b. The slit distribution area 360b is radially distributed outwards from a center of the second complete coverage area 360a. In addition, FIG. (1) of FIG. 6A illustrates a form of contact window and FIG. (2) of FIG. 6A illustrates another form of contact window, which are exemplary and are not intended to limit the scope of the present invention.

Then, the first patterned pixel electrode 350 may have the following variations. For example, the first region 350a may also be formed into a slit distribution area, i.e., the same slit of FIG. 6B is formed in the first region 350a of FIG. 6A. The slit distribution area 350b is disposed surrounding the first region 350a with the slit. That is to say, the first patterned pixel electrode 350 includes at least one slit distribution area 350b.

In addition, the first patterned pixel electrode 350 may further have the following variations. For example, the first region 350a does not have the pixel electrode, that is, no pixel electrode exists in the first region 350a of FIG. 6A, and a slit distribution area 350b is disposed surrounding the first region 350a without the pixel electrode. That is to say, the first patterned pixel electrode 350 includes a non-pixel electrode coverage area (equivalent to no pixel electrode exists in the first region 350a of FIG. 6A) and at least one slit distribution area 350b, in which the slit distribution area 350b surrounds the non-pixel electrode coverage area 350a.

It should be noted that with the configuration of the slits of the first and the second patterned pixel electrodes 350, 360, the liquid crystal molecules 392 have a plurality of inclining directions and thus forming a plurality of display regions, thereby obtaining a wide viewing angle display. In particular, the pattern design of the first and the second patterned pixel electrodes 350, 360 are applicable to make the inclining angles of the liquid crystal molecules 392 varying continuously. Therefore, the dark fringes are not generated at the junction (distinction between bright and dark) of the first and the second patterned pixel electrodes 350, 360. Since there is no impact of the dark fringes, the overall light transmittance of the multi-domain vertical alignment pixel structure 300 may be improved. The slit pattern of the first and the second patterned pixel electrodes 350, 360 is only exemplary, the slit pattern is not limited to the above in practice, and may be changed by those of ordinary skill in the art according to different requirements.

Referring to FIG. 4, FIG. 5A and FIG. 5B together, the voltage drop layer 370 may further include at least one contact window opening W1, and the second patterned pixel electrode 360 is electrically connected with the first patterned pixel electrode 350 via the contact window opening W1. In addition, the voltage drop layer 370 may be a single layer structure or a multilayer film structure formed by a stack of more than two films. In addition, referring to FIG. 5A, the multi-domain vertical alignment pixel structure 300 may further includes a color filter layer 382 disposed above the common electrode 380. The function of the color filter layer 382 enables the multi-domain vertical alignment pixel structure 300 to make a full color display.

Hereinafter, the principles for the voltage drop layer 370 of the present invention to make the first electrical field smaller than the second electrical field and the generated functions are described as follows. Referring to FIG. 5A, the multi-domain vertical alignment pixel structure 300 has a first region R1 and a second region R2. The multi-domain vertical alignment pixel structure 300 only uses one active device 340 to electrically connect the first and the second patterned pixel electrodes 350, 360, so the data voltages $V_{ITO1}$, $V_{ITO2}$ applied on the first and the second patterned pixel electrodes 350, 360 in the second region R2 are the same. In theory, the voltage differences formed between the common electrode 380 and the first and the second patterned pixel electrodes 350, 360 respectively are the same. However, since the voltage drop layer 370 is disposed and the voltage drop layer 370 makes the first electrical field smaller than the second electrical field, actually, in the first region R1, the liquid crystal molecules 392 of the liquid crystal layer 390 may sense different voltage differences from the first and the second patterned pixel electrodes 350, 360.

In more details, in the first region R1, since the voltage drop layer 370 is disposed, the liquid crystal molecules 392 sense a small voltage difference from the first patterned pixel electrode 350 and forms a low voltage region. The inclining angle of the liquid crystal molecules 392 in the low voltage region is small, so the first region R1 becomes a dark area. In addition, in the second region R2, since the second patterned pixel electrode 360 directly impacts the liquid crystal molecules 392 (and there is no impact from the voltage drop layer 370), the liquid crystal molecules 392 directly sense a large voltage difference from the second patterned pixel electrode 360 and becomes a high voltage region. The inclining angle of the liquid crystal molecules 392 in the high voltage region is large, so the second region R2 becomes a bright area. In view of the above, since one multi-domain vertical alignment pixel structure 300 may form bright and dark areas at the same time, so the low color shift display effect may be realized. In addition, when the conditions of the voltage drop layer 370 satisfy the formula (1), the voltage differences may be effectively adjusted to obtain a good liquid crystal display effect.

Referring to FIG. 5A and FIG. 5B, the meanings of the symbols in FIG. 5B are described as follows. $V_{com}$ is a common voltage applied on the common electrode 380. $V_S$ is a voltage that is obtained by a data voltage of the first patterned pixel electrode 350 after being bucked by the voltage drop layer 370 and may causes the inclining of the liquid crystal molecules 392. $V_{ITO1}$ is a data voltage applied on the first patterned pixel electrode 350. $V_{ITO2}$ is a data voltage applied on the second patterned pixel electrode 360. $C_{LC}$ is a capacitance of the liquid crystal layer 390. $C_{pass}$ is a capacitance of the voltage drop layer 370. $d_{pass}$ is a thickness of the voltage drop layer 370.

Hereinafter, the deduction of formula (1) is described and the deduction of formula (1) is directed to the first region R1 in FIG. 5A. In more details, the first and the second patterned pixel electrodes 350, 360 are equipotential ($V_{ITO1}=V_{ITO2}$), which need to be bucked by the voltage drop layer 370 to form the bright and dark areas, and the above process is performed in the first region R1. The voltage $V_S$ formed by the first patterned pixel electrode 350 after bucked by the voltage drop layer 370 may be calculated by a capacitance formula, and therefore a formula (2) is obtained:

$$V_S = (V_{ITO2} - V_{com}) \times \frac{C_{pass}}{C_{pass} + C_{LC}} + V_{com} \quad (2)$$

In general, the liquid crystal molecules 392 in the display status have an obvious visual transition effect varying from the dark state to the bright state, and the voltage difference of the voltages $V_{ITO2}(=V_{0\text{-}gray})$ and $V_{com}$ applied in the zero-gray-scale dark state is B volts greater than the voltage difference of $V_S$ and $V_{com}$. Based on the experience, B is a constant, and a preferred liquid crystal display effect may be obtained when $0.3 \leq B \leq 2$, and therefore a formula (3) is obtained:

$$(V_{ITO2}-V_{com})-(V_S-V_{com}) \geq B \quad (3)$$

Introduce the formula (2) into formula (3) to obtain a formula (4):

$$V_{ITO2} - \left[(V_{ITO2} - V_{com}) \times \frac{C_{pass}}{C_{pass} + C_{LC}} + V_{com}\right] \geq B \quad (4)$$

Simplify the formula (4) to obtain a formula (5):

$$\frac{\varepsilon_{pass}}{d_{pass}} \leq \frac{\varepsilon_{LC}}{d_{LC}} \times \left(\frac{|V_{0\text{-}gray} - V_{com}|}{B} - 1\right) \quad (5)$$

$$V_{ITO2} - V_{com} = V_{LC} \quad (6)$$

Introduce the formula (6) into the formula (5) for simplification to obtain a formula (7):

$$V_{LC} \times \left[\frac{C_{LC}}{C_{pass} + C_{LC}}\right] \geq B \quad (7)$$

Then, from the formula (7), a formula (8) is obtained:

$$V_{ITO2} - V_{com} \geq A \times \left(\frac{C_{pass} + C_{LC}}{C_{LC}}\right) \quad (8)$$

Also, a zero-gray-scale dark state voltage is defined:

$$|V_{0\text{-}gray} - V_{com}| = V_{LC} \quad (9)$$

Introduce the formula (9) into the formula (8) to obtain a formula (10):

$$V_{0\text{-}gray} - V_{com} \geq A \times \left(\frac{C_{pass} + C_{LC}}{C_{LC}}\right) \quad (10)$$

Then, from the formula (10), a formula (11) is obtained $$\left(\frac{C_{pass} + C_{LC}}{C_{LC}}\right) \leq \frac{|V_{0\text{-}gray} - V_{com}|}{B} \quad (11)$$

Then, from the formula (11), a formula (12) is obtained $$C_{pass} \leq C_{LC}\left(\frac{|V_{0\text{-}gray} - V_{com}|}{B} - 1\right) \quad (12)$$

Based on the capacitance formula (13), it is acquired that:

$$C_{pass} = \varepsilon_{pass} \times \frac{A}{d_{pass}}; \quad (13)$$

$$C_{LC} = \varepsilon_{LC} \times \frac{A}{d_{LC}}$$

Therefore, introduce the formula (13) into the formula (12), and after the organization, the configuration conditions of the voltage drop layer 370 are obtained, i.e. the formula (1), $$\frac{\varepsilon_{pass}}{d_{pass}} \leq \frac{\varepsilon_{LC}}{d_{LC}} \times \left(\frac{|V_{0\text{-}gray} - V_{com}|}{B} - 1\right) \quad (1)$$

It is known from the above description that B is a constant, and a preferred liquid crystal display effect may be obtained when $0.3 \leq B \leq 2$. For example, FIG. 7 is a curve diagram of a color shift extent changing with a viewing angle under different voltage differences. Referring to FIG. 7, the curve C1 is a curve of color shift extent changing along with the variation of the viewing angle when the voltage difference of the voltages $V_{ITO2}(=V_{0\text{-}gray})$ and $V_{com}$ applied in the zero-gray-scale dark state and the voltage difference of $V_S$ and $V_{com}$ are 0 V. The curve C2 is a curve of color shift extent changing along with the variation of the viewing angle when the voltage difference of the voltages $V_{ITO2}(=V_{0\text{-}gray})$ and $V_{com}$ applied in the zero-gray-scale dark state and the voltage difference of $V_S$ and $V_{com}$ are 0.5 V. Referring to FIG. 7, it is known that compared with the 0 V voltage difference (curve C1), when the voltage difference is 0.5 V (curve C2), the color shift phenomenon may be significantly alleviated, so B is preferably 0.5.

It should be noted that, the configuration of the voltage drop layer 370, e.g. the selection of the material (the value of the dielectric constant) and the thickness of the voltage drop layer 370 may directly influence the abovementioned voltage difference. From the formula (1) to the formula (13), when a material of the voltage drop layer 370 has a small dielectric constant or the thickness of the voltage drop layer 370 is large, a large voltage difference is obtained, and thus the first and the second patterned pixel electrodes 350, 360 generate the distinctive bright and dark areas to alleviate the color shift phenomenon. In other words, under the condition that the voltage drop layer 370 has the same thickness, the capacitance of the voltage drop layer 370 between the first and the second patterned pixel electrodes 350, 360 must be as small as possible.

To describe the configuration of the voltage drop layer 370 in details, the material of the voltage drop layer 370 is for example SiN and a high-molecular transparent insulation material (PFA) for illustration hereinafter. FIG. 8 is a curve diagram of a voltage difference verses a thickness when different materials of the voltage drop layer are selected. In FIG. 8, the curve D1 is obtained when SiN is adopted and the curve D2 is obtained when the high-molecular transparent insulation material is adopted. FIG. 9A is a schematic view of liquid crystal molecules 392 influenced by an electrical field when the material of the voltage drop layer 370 is SiN. FIG. 9B is a schematic view of liquid crystal molecules 392 influenced by an electrical field when the material of the voltage drop layer 370 is a high-molecular transparent insulation material.

Referring to FIG. 8, in the multi-domain vertical alignment pixel structure 300, if the material of the voltage drop layer 370 is SiN, the dielectric constant ($\in_{pass}$) is 10 and when the thickness ($d_{pass}$) is 0.3 μm, the voltage difference is 0.2 V. If the material of the voltage drop layer 370 is the high-molecular transparent insulation material, the dielectric constant ($\in_{pass}$) is 3.5 and when the thickness ($d_{pass}$) is 0.3 μm, the voltage differences is 0.7V.

After comparing FIG. 9A and FIG. 9B, as shown in FIG. 9A, when the material of the voltage drop layer 370 is SiN, if the thickness is 0.3 μm, the voltage difference is only 0.2 V, and the fringe electrical field $E_{SiN}$ additionally generated by the second patterned pixel electrode 360 is weak, so the bright and dark areas are not obvious, and even if the thickness is increased to be 3 μm, the voltage difference is only increased to be 1.3 V. However, as shown in FIG. 9B, when the material of the voltage drop layer 370 is the high-molecular transparent insulation material, if the thickness is 3 μm, the voltage difference is about 3 V, and the fringe electrical field $E_{PFA}$ generated by the second patterned pixel electrode 360 is strong. That is to say, under the condition of the same thickness, the voltage drop layer 370 made of the high-molecular transparent insulation material generates a large voltage difference, so the liquid crystal molecules 392 influenced by the fringe electrical field $E_{PFA}$ have a quick response and large inclining angle, and thus the bright and dark areas are distinctive. In this manner, the low color shift display effect is achieved. The material, thickness and number of films of the voltage drop layer 370 may be changed according to the requirements of the design, and are only exemplary herein and are not intended to limit the scope of the present invention.

In view of the above, the multi-domain vertical alignment pixel structure 300 only uses one active device 340 to electrically connect the first and the second patterned pixel electrodes 350, 360. Although the data voltages applied on the first and the second patterned pixel electrodes 350, 360 are the same, with the configuration of the voltage drop layer 370, actually the liquid crystal molecules 392 may respectively sense different voltage differences from the first and the second patterned pixel electrodes 350, 360. Therefore, the multi-domain vertical alignment pixel structure 300 may reduce the number of the active device 340, has a simple structure and may produce the obvious voltage differences to generate the bright and dark areas, thereby achieving the low color shift display effect.

FIG. 10 is a schematic three-dimensional view of a liquid crystal display panel according to an exemplary embodiment of the present invention. Referring to FIG. 10, the liquid crystal display panel 400 includes a plurality of multi-domain vertical alignment pixel structures 300. Every multi-domain vertical alignment pixel structure 300 has been described in the above embodiment, so the details will not be repeated herein. The total number of the active devices used in the liquid crystal display panel 400 is relatively small, so the fabricating cost is reduced. In particular, the configuration of one active device 340, the first and the second patterned pixel electrodes 350, 360 and the voltage drop layer 370 may easily achieve the low color shift display effect, thereby providing a good display quality.

FIG. 11 is a schematic view of a liquid crystal display according to an exemplary embodiment of the present invention. Referring to FIG. 11, the liquid crystal display 600 includes the liquid crystal display panel 400 and the backlight module 500. The liquid crystal display panel 400 is disposed above the backlight module 500. Likewise, the liquid crystal display panel 400 includes a plurality of multi-domain vertical alignment pixel structures 300. Every multi-domain vertical alignment pixel structure 300 has been described in the above embodiment, so the details will not be repeated herein. In addition, the backlight module 500 may be a direct-type backlight module or a side-type backlight module to provide an area light source L for the liquid crystal display panel 400, and the type of the backlight module 500 is not limited herein. The liquid crystal display 600 adopts the liquid crystal display panel 400 with a low color shift effect, so the liquid crystal display 600 can provide a good display quality.

FIG. 12A to FIG. 12E are schematic views of a part of processing flows of a fabricating method of a substrate with a multi-domain vertical alignment pixel structure according to an exemplary embodiment of the present invention. Referring to the fabricating processes of FIG. 12A to FIG. 12E together with FIG. 4 and FIG. 5A, the fabricating processes of the substrate 310 with the multi-domain vertical alignment pixel structure 300 may be understand.

Figure 12A:
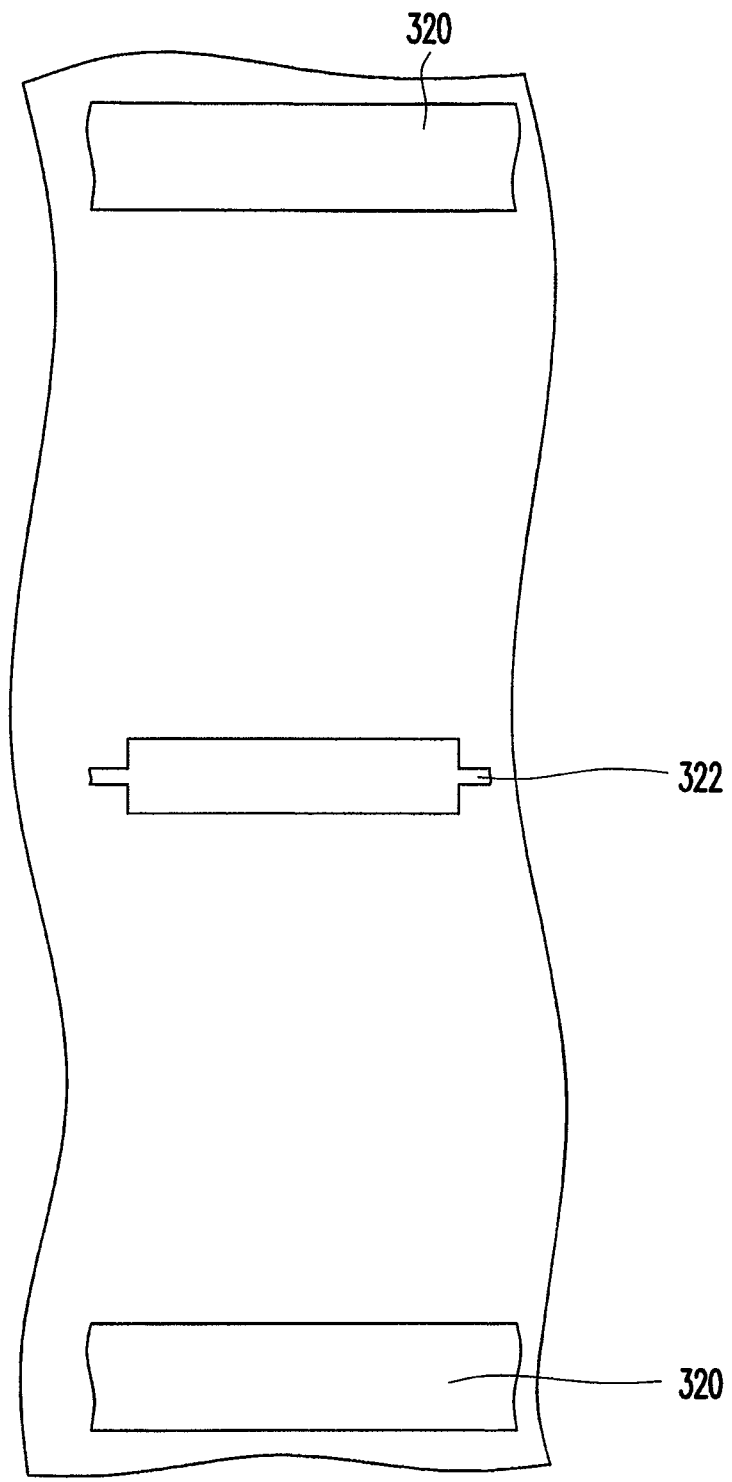

Firstly, referring to FIG. 5A and FIG. 12A, a substrate 310 is provided. The substrate 310 may be a glass substrate or a quartz substrate.

Figure 12B:
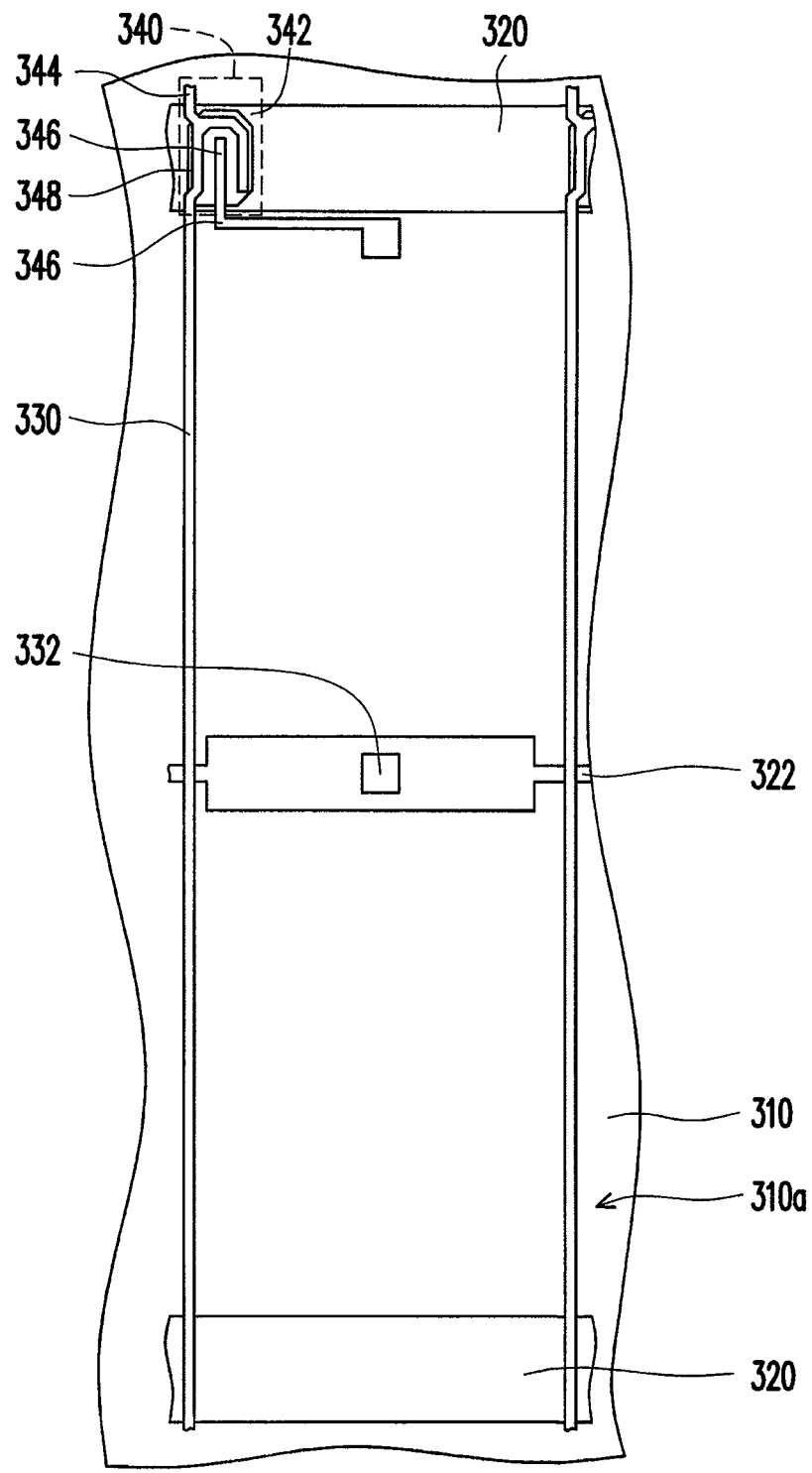

Then, referring to FIG. 12A and FIG. 12B, a scan line 320, a data line 330 and an active device 340 are formed on the substrate 310. The scan line 320 and the data line 330 divide the substrate 310 into a plurality of pixel regions 310a, and the active device 340 is electrically connected with the scan line 320 and the data line 330. In details, in FIG. 12A, the first mask process (Metal 1) is performed, in which the scan line 320 and the gate 342 of the follow-up active device 340 are formed. In addition, a storage capacitance electrode 322 may be formed on the substrate 310 and between the two adjacent scan lines 320.

In FIG. 5A and FIG. 12B, a second mask process (Metal 2) is performed, in which the data line 330 is formed and the active device 340 is formed by a stack of films. The active device 340 includes a gate 342, a source 344 and a drain 346. The gate 342 is electrically connected with the scan line 320, the source 344 is electrically connected with the data line 330, and the drain 346 is electrically connected with the first and the second patterned pixel electrodes 350, 360 which are formed subsequently. In particular, the active device 340 further has a channel layer 348, so that electrons move in the channel layer 348. In addition, in the step, a second metal electrode 332 may also be formed above the storage capacitance electrode 322, so that the storage capacitance electrode 322, the gate insulating layer (not shown) and the second metal electrode 332 form a storage capacitance (Cst).

Figure 12C:
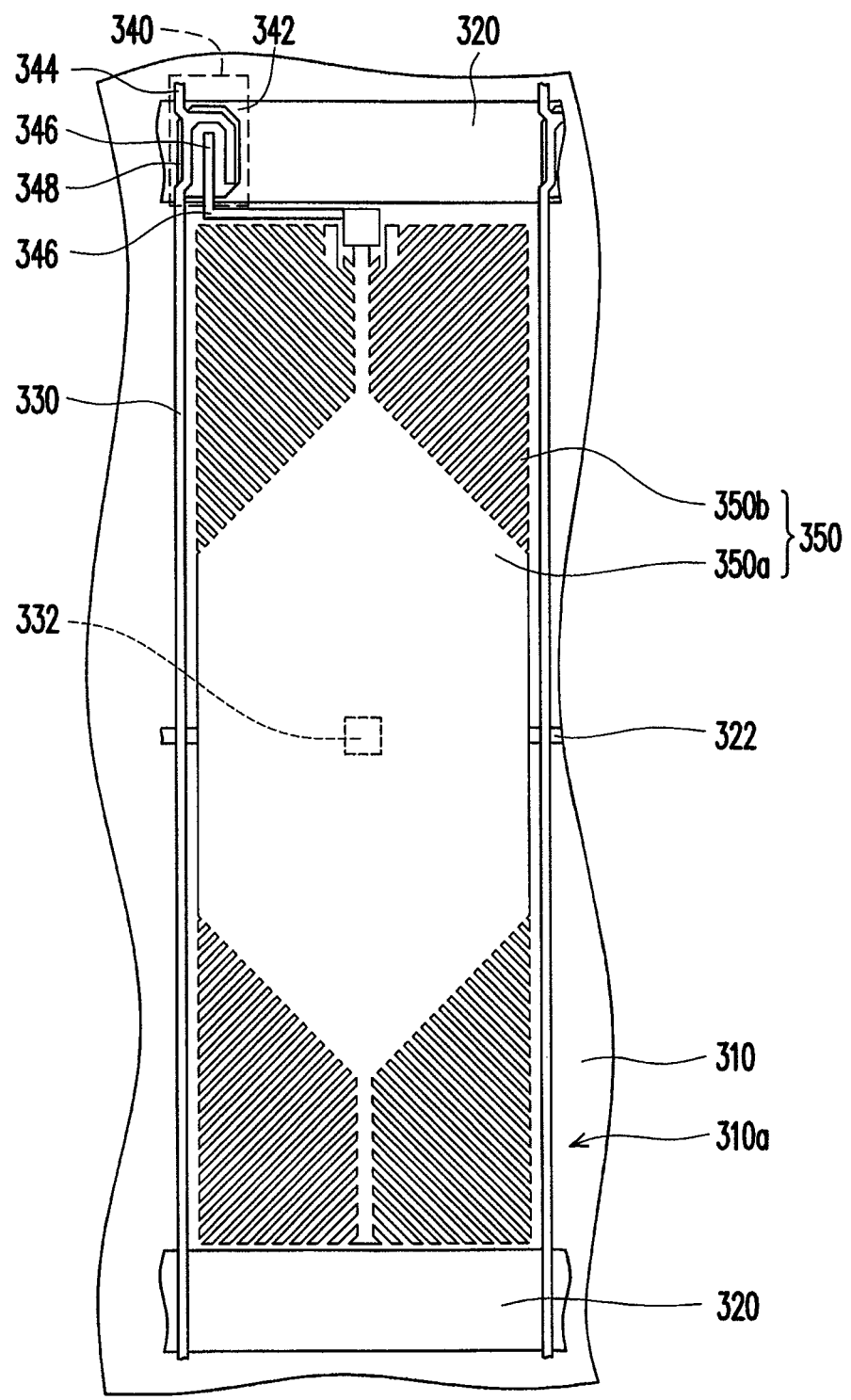

Then, referring to FIG. 5A and FIG. 12C, a first patterned pixel electrode 350 is formed on the substrate 310 and is electrically connected with the active device 340. The first patterned pixel electrode 350 includes a first region 350a and at least one slit distribution area 350b. In one embodiment, the first region 350a is a complete coverage area. A plurality of liquid crystal molecules 392 of the liquid crystal layer 390 formed subsequently has a plurality of inclining directions, in which the first region 350a is disposed at the inclining center of the inclining directions of the liquid crystal molecules 392, and the slit distribution area 350b stabilizes the inclining directions of the liquid crystal molecules 392, referring to FIG. 5A at the same time. In some embodiments, the patterned pixel electrode 350 may also be electrically connected with the second metal electrode 332.

Figure 12D:
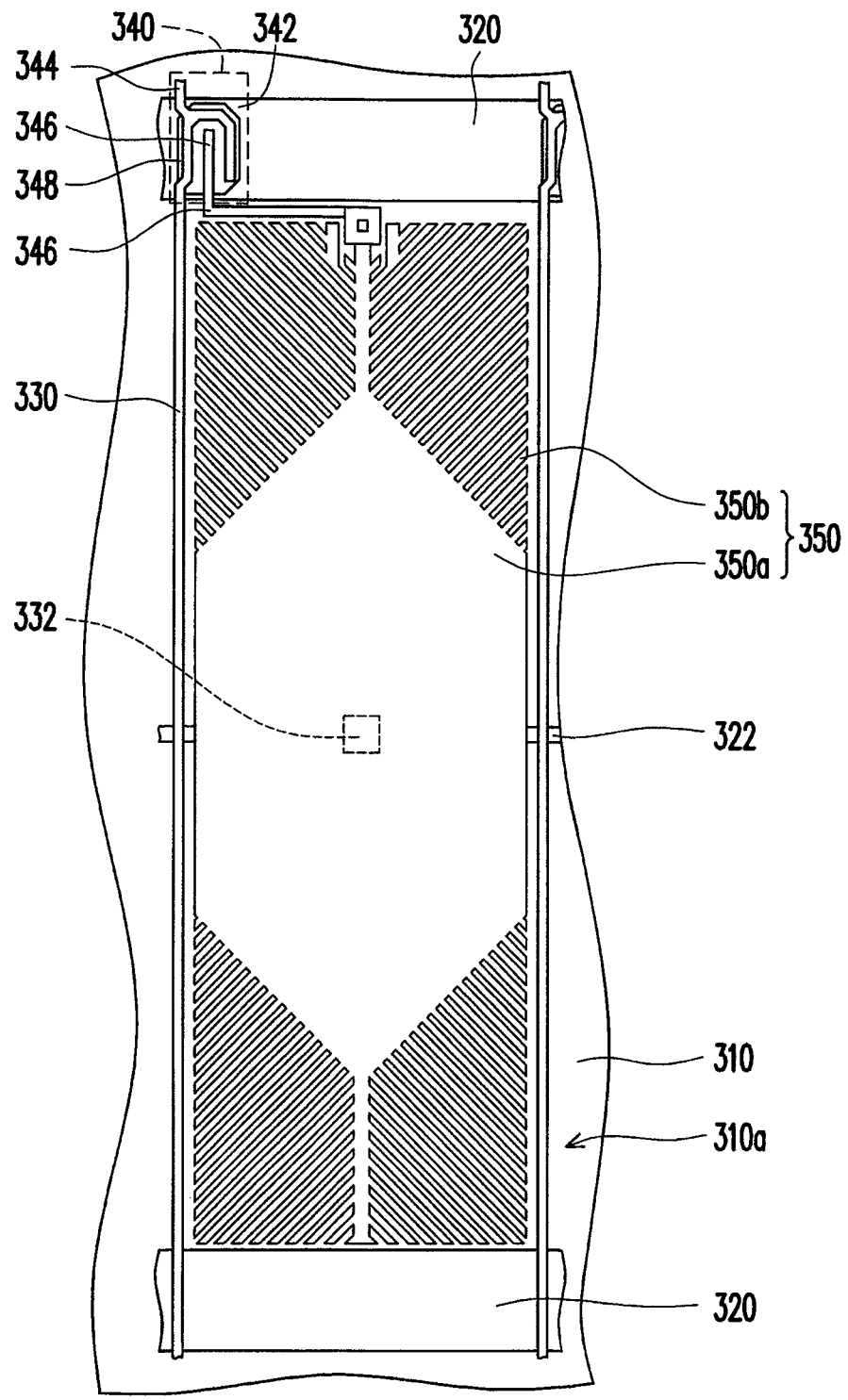

After that, referring to FIG. 5A and FIG. 12D, a voltage drop layer 370 (as shown in FIG. 5A) is formed on the first patterned pixel electrode 350. A material of the voltage drop layer 370 may be SiN or a high-molecular transparent insulation material, and the voltage drop layer 370 may be a single layer structure or multilayer film structure.

Figure 12E:
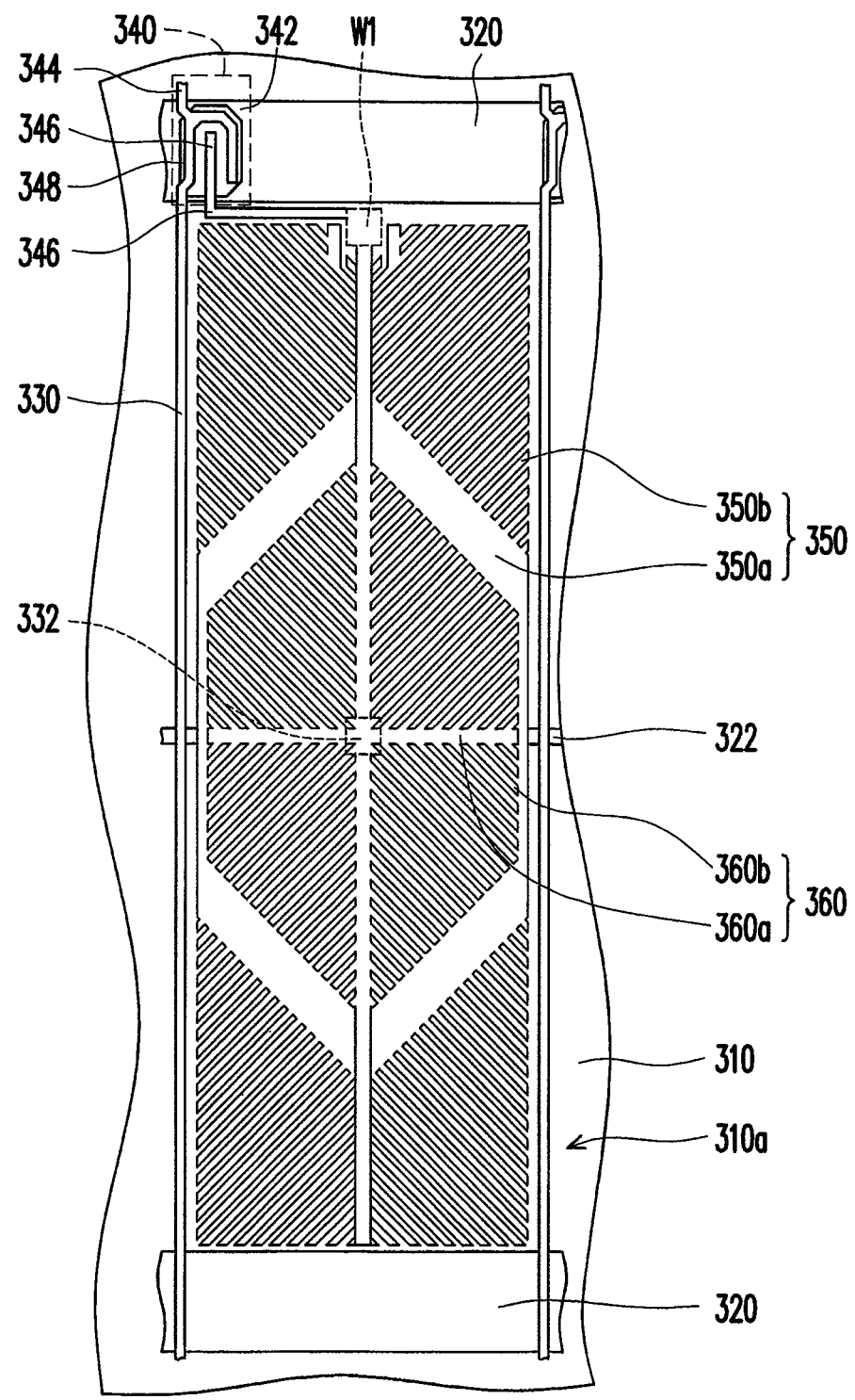

Then, referring to FIG. 5A and FIG. 12E, a second patterned pixel electrode 360 is formed on the voltage drop layer 370 and is electrically connected with the active device 340. The second patterned pixel electrode 360 may include a second complete coverage area 360a and at least one slit distribution area 360b. The slit distribution area 360b is radially distributed outwards from a center of the second complete coverage area 360a, referring to FIG. 6B at the same time. In particular, at least one contact window opening W1 may be formed in the voltage drop layer 370, such that the formed second patterned pixel electrode 360 is electrically connected with the first patterned pixel electrode 350 via the contact window opening W1. Till now, the fabricating of the substrate 310 with the multi-domain vertical alignment pixel structure 300 is completed.

Then, referring to FIG. 5A, a common electrode 380 may be further formed on the counter side of the first and the second patterned pixel electrodes 350, 360. After that, a liquid crystal layer 390 is formed between the common electrode 380 and the first and the second patterned pixel electrodes 350, 360. In this manner, the fabricating of the multi-domain vertical alignment pixel structure 300 is completed, in which the first patterned pixel electrode 350 and the second patterned pixel electrode 360 are equipotential. The first patterned pixel electrode 350 provides a first electrical field to the liquid crystal layer 390, the second patterned pixel electrode 360 provides a second electrical field to the liquid crystal layer 390, and voltage drop layer 370 makes the first electrical field smaller than the second electrical field. It should be noted that when fabricating the voltage drop layer 370, the voltage drop layer 370 should satisfy the following conditions:

$$\frac{\varepsilon_{pass}}{d_{pass}} \leq \frac{\varepsilon_{LC}}{d_{LC}} \times \left( \frac{|V_{0-gray} - V_{com}|}{B} - 1 \right)$$

$\varepsilon_{pass}$ is a dielectric constant of the voltage drop layer 370, $\varepsilon_{LC}$ is a dielectric constant of the liquid crystal layer 390, $d_{pass}$ is a thickness of the voltage drop layer 370, $V_{com}$ is a voltage applied on the common electrode 380, $d_{LC}$ is a thickness of the liquid crystal layer 390, $V_{0-gray}$ is a data voltage applied on the first patterned pixel electrode 350 in a zero-gray-scale dark state, where B is a constant and $0.3 \leq B \leq 2$, and in another embodiment, B may also be 0.5. In addition, as shown in FIG. 5A, a color filter layer 382 may be further formed above the common electrode 380, so as to realize the full color display.

The Second Embodiment

Additionally, in order to solve the problem that the width of the elongated pixel electrode pattern J cannot be effectively increased due to the process width limit 3.5 μm of the resolution and the etching process capability of the exposure machine currently, two levels of the patterned pixel electrodes are adopted in the pixel structure 700 according to the embodiment of FIG. 13A, and the strip electrodes of the two levels of the patterned pixel electrodes are shifted for a certain distance, thereby increasing the width of the strip electrodes equivalently, so as to solve the problem of the dark fringe phenomenon caused by the low electrical field intensity at the slit, and the details are described as follows.

FIG. 13A is a schematic top view of another substrate with a multi-domain vertical alignment pixel structure according to an exemplary embodiment of the present invention. FIG. 13B is a schematic cross-sectional view of the multi-domain vertical alignment pixel structure in FIG. 13A taken along Line B-B'. Referring to FIG. 13A and FIG. 13B together, the substrate 710 with the multi-domain vertical alignment pixel structure 700 includes a scan line 720 and a data line 730, a first active device 740, a second active device 750, a first patterned pixel electrode 760, a passivation layer (may be a SiN layer $L_{SiN}$) and a second patterned pixel electrode 770. In addition, a counter substrate 782 may also be disposed, which has a common electrode 780. The counter substrate 782 is disposed on a counter side of the substrate 710, and the common electrode 780 is corresponding to the first and the second patterned pixel electrodes 760, 770. The liquid crystal layer 790 is sandwiched between the counter substrate 782 and the substrate 710.

Referring to FIG. 13A and FIG. 13B continuously, the first active device 740 is electrically connected with the corresponding scan line 720 and data line 730. The second active device 750 is electrically connected with the corresponding scan line 720 and data line 730. The first patterned pixel electrode 760 is electrically connected with the first active device 740 and has a plurality of first strip electrodes 760a (which is further shown in FIG. 14A). The passivation layer (the SiN layer $L_{SiN}$) is disposed on the first patterned pixel electrode 760. The second patterned pixel electrode 770 is electrically connected with the second active device 750 and has a plurality of second strip electrodes 770a (which is further shown in FIG. 14B).

In particular, the first strip electrode 760a and the second strip electrode 770a are partially overlapped, and the second strip electrode 770a is shifted for a predetermined distance d1 from the first strip electrode 760a.

The shifting distance d1 and the width d2 of the first strip electrode 760a and the second strip electrode 770a may be considered in combination to reduce the width d4 of the slit S. In an embodiment, as shown in FIG. 13B, each of the first strip electrodes 760a and each of the second strip electrodes 770b have a the width d2 of 3.5 μm, and the predetermined distance d1 is 1.5 μm, so that a total width d3 obtained after each of the first strip electrodes 760a and each of the second strip electrodes 770a are overlapped is 5 μm. Now, the width d4 of the slit S becomes 2 μm.

The predetermined distance d1 may be ranging from 0.1 μm to 2.5 μm, and preferably is ranging from 0.5 μm to 1.5 μm. In addition, a total width d3 of each of the first strip electrodes 760a and each of the second strip electrodes 770a is ranging from 3.6 μm to 6 μm, and preferably is ranging from 4 μm to 5 μm. Now, the width d4 of the slit S may be ranging from 1 μm to 3.4 μm, and preferably is ranging from 2 μm to 3 μm. In this range, the width d4 of the slit S is effectively reduced, thereby increasing the electrical field intensity at the slit S.

It is clearly known that the width of the slit S may be effectively reduced in the above manner even if currently the process width limit of the resolution and the etching process capability of the exposure machine is 3.5 µm (that is, originally, only the slit S with the width of 3.5 µm can be fabricated).

Accordingly, the first patterned pixel electrode 760 and the second patterned pixel electrode 770 are overlapped to reduce the width d4 of the slit S and further increase the electrical field intensity at the slit S. Therefore, at the slit S, the liquid crystal molecules (not shown) which are not inclined in the liquid crystal layer 790 are influenced by the increased electrical field intensity to get inclined, so the multi-domain vertical alignment pixel structure 700 can further reduce the dark fringe.

Referring to FIG. 13B, the multi-domain vertical alignment pixel structure 700 may include a SiN layer $L_{SiN}$ disposed between the first patterned pixel electrode 760 and the second patterned pixel electrode 770. The first active device 740 and the second active device 750 may respectively supply the high voltage and low voltage to the first patterned pixel electrode 760 and the second patterned pixel electrode 770, so as to form the bright and dark areas. In particular, it is known from the D1 curve in FIG. 8 that the bucking effect of the SiN layer $L_{SiN}$ is not large, so the overall display effect is not affected.

FIG. 14A is a schematic top view of a first patterned pixel electrode of the multi-domain vertical alignment pixel structure in FIG. 13A. FIG. 14B is a schematic top view of a second patterned pixel electrode of the multi-domain vertical alignment pixel structure in FIG. 13A. Referring to FIG. 14A and FIG. 14B together, it is known that the first patterned pixel electrode 760 has a plurality of strip electrodes 760a and the second patterned pixel electrode 770 has a plurality of strip electrodes 770a. Basically, the first patterned pixel electrode 760 and the second patterned pixel electrode 770 have the same pattern, and respectively have cross portions 762, 772, annular portions 764, 774 and radial strip portions 766, 776 (i.e. the first and second strip electrodes 760a, 770a).

The fabricating processes of the pixel structure 700 on the side of the active device array substrate is similar to five mask processes, which substantially include: fabricating a Metal 1 (the scan line 720 and the gate of the first and second active devices 740, 750), covering an insulating layer GIN, fabricating channel layers of the first and the second active devices 740, 750, fabricating a Metal 2 (the data line 730 and source and drain of the first and the second active devices 740, 750), fabricating the first patterned pixel electrode 760, covering a passivation layer (the SiN layer $L_{SiN}$) and fabricating the second patterned pixel electrode 770 and so on. It should be noted that in the above fabricating processes, the first patterned pixel electrode 760 and the second patterned pixel electrode 770 are not aligned on purpose, and the second strip electrode 770a is shifted for a predetermined distance d1 from the first strip electrode 760a. Thus, the process width limit (3.5 µm) of the resolution and the etching process capability of the exposure machine is overcome, thereby effectively reducing the width of the slit S and reducing the dark fringe of the pixel structure 700.

Likewise, the substrate 710 with the multi-domain vertical alignment pixel structure 700 in the second embodiment may be applied in the liquid crystal display panel (not shown) and the liquid crystal display (not shown), and the details will not be repeated herein.

The Third Embodiment

Furthermore, in order to solve the dark fringe problem of the multi-domain vertical alignment liquid crystal display panel 202 in FIG. 3, the present invention also provides another substrate 810 with the multi-domain vertical alignment pixel structure 800, which is illustrated in details hereinafter.

FIG. 15A is a schematic top view of still another substrate with a multi-domain vertical alignment pixel structure according to an exemplary embodiment of the present invention. FIG. 15B is a schematic cross-sectional view of the multi-domain vertical alignment pixel structure in FIG. 15A taken along Line II-II'. FIG. 15C is a schematic cross-sectional view of the multi-domain vertical alignment pixel structure in FIG. 15A taken along Line III-III'. The connection of the first patterned pixel electrode 875 and the biased electrode 850 (equipotential) may be obtained from FIG. 15B and the distribution of the electrical field caused by the first patterned pixel electrode 875, the second patterned pixel electrode 876 and the biased electrode 850 may be obtained from FIG. 15C.

Referring to FIG. 15A to FIG. 15C together, the substrate 810 with the multi-domain vertical alignment pixel structure 800 includes a scan line 820 and a data line 830, a first active device 840, a second active device 845, a patterned pixel electrode 870, a biased electrode 850 and a passivation layer 860. Likewise, the common electrode 880 may be disposed on a counter side of the patterned pixel electrode 870, and the liquid crystal layer 890 may be disposed between the common electrode 880 and the patterned pixel electrode 870.

Referring to FIG. 15A and FIG. 15B, a scan line 820 and a data line 830 are disposed on the substrate 810. The active device 840 is disposed on the substrate 810 and is electrically connected with the corresponding scan line 820 and data line 830. The patterned pixel electrode 870 has a first patterned pixel electrode 875 and a second patterned pixel electrode 876, and the first active device 840 and the second active device 845 may respectively provide a high voltage and a low voltage to the first patterned pixel electrode 875 and the second patterned pixel electrode 876, so as to produce the bright and dark areas. In this embodiment, for example, the biased electrode 850 is disposed on the substrate 810, the voltage drop layer 860 is disposed on the biased electrode 850 and the patterned pixel electrode 870 is disposed on the voltage drop layer 860, which are not limited to this, and alternatively, the patterned pixel electrode 870 is disposed on the substrate 810, the voltage drop layer 870 is disposed on the patterned pixel electrode 870 and the biased electrode 850 is disposed on the voltage drop layer 870. The patterned pixel electrode 860 has a high voltage region $V_H$, a low voltage region $V_L$ and a boundary region $V_I$ between the high voltage region $V_H$ and the low voltage region $V_L$. The common electrode 880 is disposed on the counter side of the patterned pixel electrode 870. The liquid crystal layer 890 is disposed between the common electrode 880 and the patterned pixel electrode 870.

In this embodiment, for example, the biased electrode 850 is electrically connected with the high voltage region $V_H$ and is disposed corresponding to the position of the boundary region $V_I$, which is not limited to this. The electrical field intensity $E_H$ of the high voltage region $V_H$ obtained by the above configuration is greater than the electrical field intensity $E_I$ of the boundary region $V_I$, and the electrical field intensity $E_I$ of the boundary region $V_I$ is greater than the electrical field intensity $E_L$ of the low voltage region $V_L$.

In more details, referring to FIG. 15A and FIG. 15B together, on the position of the patterned pixel electrode 870 in the upper layer, a low voltage is applied on the low voltage region $V_L$ and a high voltage is applied on the high voltage region. Since the biased electrode 850 in the lower layer is electrically connected with the patterned pixel electrode 870 in the high voltage region $V_H$, the biased electrode 850 and the patterned pixel electrode 870 (i.e. the first patterned pixel electrode 875) in the high voltage region are equipotential. It should be noted that the biased electrode 850 is disposed in the boundary region $V_I$ and below the voltage drop layer 860, so at the boundary region $V_I$, the voltage sensed by the liquid crystal molecules 892 is bucked by the voltage drop layer 860 and the electrical field $E_I$ is formed at the boundary region $V_I$. The electrical field intensity of the electrical field $E_I$ is between the electrical field intensity of the electrical field $E_H$ of the high voltage region $V_H$ and the electrical field intensity of the electrical field $E_L$ of the low voltage region $V_L$.

Accordingly, the liquid crystal molecules 892 in the boundary region $V_1$ with the biased electrode 850 disposed there below may be continuously inclined, and thus the dark fringe is eliminated. That is to say, after comparing FIG. 3 and FIG. 15B, only one dark fringe at arrow A in the middle position is left. The design of the pixel structure 800 may reduce the number of the dark fringe.

Referring to FIG. 15B and FIG. 15C, the edge of the biased electrode 850 is at a predetermined interval d from the edge of the patterned pixel electrode 870 of the low voltage region $V_L$ in a direction from the low voltage region $V_L$ (the second region) to the high voltage region $V_H$ (the first region). The above predetermined interval d may be $0 \leq d \leq 1$ µm (for example, d=0 µm in FIG. 15B and FIG. 15C). In this range, a preferred electrical field intensity $E_I$ may be formed in the boundary region $V_I$, such that the liquid crystal molecules 892 in the boundary region $V_I$ are inclined. The above situation occurs because the liquid crystal molecules 892 may be inclined in the direction of the high electrical field, since $E_L < E_I < E_H$, a gap is generated at the junction of the biased electrode and the $V_L$ region. The electrical field $E_I$ is generated after the $V_H$ is bucked by the voltage drop layer 860, so the difference between the electrical fields $E_L$ and $E_I$ is large, and the liquid crystal molecules 892 are easily inclined to the $V_I$ region, but the gap cannot be too large. The difference between the electrical fields $E_H$ and $E_I$ is small, e.g. a gap is generated between the biased electrode and the $V_H$ region, the liquid crystal molecules 892 are not easily inclined to the $V_H$ region.

FIG. 16A is a schematic top view of a biased electrode of the substrate with a multi-domain vertical alignment pixel structure in FIG. 15A. FIG. 16B is a schematic top view of a patterned pixel electrode of the substrate with a multi-domain vertical alignment pixel structure in FIG. 15A. Referring to FIG. 16A, the biased electrode 850 may have an annular portion 852 and a strip portion 854. The material of the biased electrode 850 may be a metal or a transparent conductive material, in which when the transparent conductive material is adopted, for example, the Indium Tin Oxide (ITO) and Indium Zinc Oxide (IZO) are used.

Referring to FIG. 16B, the patterned pixel electrode 870 may have an annular portion 872 and a plurality of radial strip portions 874a disposed on an inner side of the annular portion 872 and a plurality of radial strip portions 874b disposed on an outer side of the annular portion 872. In particular, the annular portion 872 of the patterned pixel electrode 870 surrounds the annular portion 852 of the biased electrode 850, and the annular portion 872 and the annular portion 852 are separated by the predetermined distance d.

The fabricating processes of the pixel structure 800 on the active device array substrate are similar to the five mask processes. However, the processes are different depending on whether the biased electrode 850 is fabricated in the Metal 1 process or is fabricated by an additional process using the transparent conductive material, and the processes are respectively illustrated as follows.

[Fabricating the Biased Electrode 850 in the Metal 1 Process]

The fabricating processes of the multi-domain vertical alignment pixel structure 800 substantially include: fabricating the Metal 1 (the scan line 820, the gate of the active device 840 and the biased electrode 850), covering an insulating layer (not shown), fabricating the channel layer of the active device 840, fabricating the Metal 2 (the data line 830 and the source and drain of the active device 840), covering the voltage drop layer 860 and fabricating the patterned pixel electrode 870 and so on.

[Fabricating the Biased Electrode 850 by the Transparent Conductive Material]

The fabricating processes of the multi-domain vertical alignment pixel structure 800 substantially include: fabricating the Metal 1 (the scan line 820 and the gate of the active device 840), covering an insulating layer (not shown), fabricating the channel layer of the active device 840, fabricating the Metal 2 (the data line 830 and the source and drain of the active device 840), fabricating the biased electrode 850 by the transparent conductive material, covering the voltage drop layer 860 and fabricating the patterned pixel electrode 870 and so on. With the special design of the pixel structure 800, only one dark fringe is left (e.g. the arrow A in FIG. 15B), thereby greatly reducing the number of the dark fringe.

Likewise, the substrate 810 with the multi-domain vertical alignment pixel structure 800 in the third embodiment may be used in the liquid crystal display panel (not shown) and the liquid crystal display (not shown), and the details will not be described herein.

In view of the above, the substrate with a multi-domain vertical alignment pixel structure and the fabricating method thereof, liquid crystal display panel and liquid crystal display provided by the present invention at least have the following advantages.

(1) With the design of the voltage drop layer, the multi-domain vertical alignment pixel structure of the present invention may use one active device to generate consecutive bright and dark areas in one pixel structure. Compared with the prior arts, since the number of the active devices is reduced, the structure is simple and additionally the fabricating cost is lowered. With the proper configuration of the slit, the low color shift display effect is achieved and meanwhile the overall light transmittance of the multi-domain vertical alignment pixel structure is achieved. The liquid crystal display panel and the liquid crystal display when adopting the above pixel structure can provide a good display quality, thereby saving the fabricating cost. Furthermore, the fabricating method of the above multi-domain vertical alignment pixel structure may be used to fabricate the multi-domain vertical alignment pixel structure having the low color shift effect and simple structure.

(2) The double-layered patterned pixel electrodes are not aligned, and the strip electrodes thereof are overlapped, thereby solving the problem of the process width limit (3.5 µm) of the resolution and the etching process capability of the exposure machine. Therefore, the width of the slit can be effectively reduced, thereby reducing the dark fringe of the pixel structure.

(3) The voltage drop layer and the biased electrode are disposed in the boundary region between the high voltage region and the low voltage region, thereby obtaining the electrical field with the electrical field intensity between the high voltage region and the low voltage region. Therefore, the dark fringe in the boundary region is eliminated, thereby greatly reducing the number of the dark fringe.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A substrate with a multi-domain vertical alignment pixel structure, wherein the substrate is opposite to a counter substrate having a common electrode and a liquid crystal layer is disposed between the substrate and the counter substrate, the substrate comprising:
    a scan line and a data line, for dividing the substrate into a plurality of pixel regions;
    an active device, electrically connected with the scan line and the data line;
    a first patterned pixel electrode, electrically connected with the active device;
    a voltage drop layer, disposed above the first patterned pixel electrode; and
    a second patterned pixel electrode, disposed above the first patterned pixel electrode and electrically connected with the active device;
    wherein the first patterned pixel electrode and the second patterned pixel electrode are equipotential, the first patterned pixel electrode provides a first electrical field to the liquid crystal layer, the second patterned pixel electrode provides a second electrical field to the liquid crystal layer, and the voltage drop layer makes the first electrical field smaller than the second electrical field.

2. The substrate with the multi-domain vertical alignment pixel structure according to claim 1, wherein the voltage drop layer satisfies the following conditions:

$$\frac{\varepsilon_{pass}}{d_{pass}} \leq \frac{\varepsilon_{LC}}{d_{LC}} \times \left(\frac{|V_{0-gray} - V_{com}|}{B} - 1\right),$$

$\varepsilon_{pass}$ is a dielectric constant of the voltage drop layer, $\varepsilon_{LC}$ is a dielectric constant of the liquid crystal layer, $d_{pass}$ is a thickness of the voltage drop layer, $d_{LC}$ is a thickness of the liquid crystal layer, $V_{0-gray}$ is a data voltage applied on the first patterned pixel electrode in a zero-gray-scale dark state, $V_{com}$ is a voltage applied on the common electrode, where $0.3 \leq B \leq 2$.

3. The substrate with the multi-domain vertical alignment pixel structure according to claim 1, wherein the voltage drop layer satisfies the following conditions:

$$\frac{\varepsilon_{pass}}{d_{pass}} \leq \frac{\varepsilon_{LC}}{d_{LC}} \times \left(\frac{|V_{0-gray} - V_{com}|}{B} - 1\right),$$

$\varepsilon_{pass}$ is a dielectric constant of the voltage drop layer, $\varepsilon_{LC}$ is a dielectric constant of the liquid crystal layer, $d_{pass}$ is a thickness of the voltage drop layer, $d_{LC}$ is a thickness of the liquid crystal layer, $V_{0-gray}$ is a data voltage applied on the first patterned pixel electrode in a zero-gray-scale dark state, $V_{com}$ is a voltage applied on the common electrode, where B is 0.5.

4. The substrate with the multi-domain vertical alignment pixel structure according to claim 1, wherein the voltage drop layer has a multilayer film structure.

5. The substrate with the multi-domain vertical alignment pixel structure according to claim 1, wherein the active device comprises:
    a gate, electrically connected with the scan line;
    a source and a drain, wherein the source is electrically connected with the data line, and the drain is electrically connected with the first and the second patterned pixel electrodes.

6. The substrate with the multi-domain vertical alignment pixel structure according to claim 1, wherein the voltage drop layer comprises at least one contact window opening, the second patterned pixel electrode is electrically connected with the first patterned pixel electrode through the contact window opening.

7. The substrate with the multi-domain vertical alignment pixel structure according to claim 1, wherein the first patterned pixel electrode comprises a first region and at least one slit distribution area;
    a plurality of liquid crystal molecules of the liquid crystal layer has a plurality of inclining directions, wherein the first region is disposed at an inclining center of the inclining directions of the liquid crystal molecules, and the slit distribution area stabilizes the inclining directions of the liquid crystal molecules.

8. The substrate with the multi-domain vertical alignment pixel structure according to claim 1, wherein the first patterned pixel electrode comprises a non-pixel electrode coverage area and at least one slit distribution area, and the slit distribution area surrounds the non-pixel electrode coverage area.

9. The substrate with the multi-domain vertical alignment pixel structure according to claim 1, wherein the second patterned pixel electrode comprises a second complete coverage area and at least one slit distribution area, and the slit distribution area is radially distributed outwards from a center of the second complete coverage area.

10. A liquid crystal display panel, comprising:
    a substrate, comprising:
    a scan line and a data line, disposed on the substrate, and dividing the substrate into a plurality of pixel regions, wherein each of the pixel regions has a first region and a second region;
    an active device, disposed on the substrate and electrically connected with the scan line and the data line;
    a first patterned pixel electrode, at least disposed in the first region and electrically connected with the active device;
    a voltage drop layer, disposed above the first patterned pixel electrode; and
    a second patterned pixel electrode, disposed in the second region and electrically connected with the active device;
    a counter substrate, having a common electrode, wherein the counter substrate is disposed on a counter side of the substrate, and the common electrode is corresponding to the first and the second patterned pixel electrodes; and
    a liquid crystal layer, sandwiched between the counter substrate and the substrate;
    wherein the first patterned pixel electrode and the second patterned pixel electrode are equipotential, the first patterned pixel electrode provides a first electrical field to the liquid crystal layer, the second patterned pixel electrode provides a second electrical field to the liquid crystal layer, and the voltage drop layer makes the first electrical field smaller than the second electrical field.

11. The liquid crystal display panel according to claim 10, wherein the voltage drop layer satisfies the following conditions:

$$\frac{\varepsilon_{pass}}{d_{pass}} \le \frac{\varepsilon_{LC}}{d_{LC}} \times \left(\frac{|V_{0-gray} - V_{com}|}{B} - 1\right)$$

$\varepsilon_{pass}$ is a dielectric constant of the voltage drop layer, $\varepsilon_{LC}$ is a dielectric constant of the liquid crystal layer, $d_{pass}$ is a thickness of the voltage drop layer, $d_{LC}$ is a thickness of the liquid crystal layer, $V_{0-gray}$ is a data voltage applied on the first patterned pixel electrode in a zero-gray-scale dark state, $V_{com}$ is a voltage applied on the common electrode, where $0.3 \le B \le 2$.

12. The liquid crystal display panel according to claim 10, wherein the voltage drop layer satisfies the following conditions:

$$\frac{\varepsilon_{pass}}{d_{pass}} \le \frac{\varepsilon_{LC}}{d_{LC}} \times \left(\frac{|V_{0-gray} - V_{com}|}{B} - 1\right),$$

$\varepsilon_{pass}$ is a dielectric constant of the voltage drop layer, $\varepsilon_{LC}$ is a dielectric constant of the liquid crystal layer, $d_{pass}$ is a thickness of the voltage drop layer, $d_{LC}$ is a thickness of the liquid crystal layer, $V_{0-gray}$ is a data voltage applied on the first patterned pixel electrode in a zero-gray-scale dark state, $V_{com}$ is a voltage applied on the common electrode, where B is 0.5.

13. The liquid crystal display panel according to claim 10, wherein the voltage drop layer has a multilayer film structure.

14. The liquid crystal display panel according to claim 10, wherein the active device comprises:
a gate, electrically connected with the scan line;
a source and a drain, wherein the source is electrically connected with the data line, and the drain is electrically connected with the first and the second patterned pixel electrodes.

15. The liquid crystal display panel according to claim 10, wherein the voltage drop layer comprises at least one contact window opening, and the second patterned pixel electrode is electrically connected with the first patterned pixel electrode through the contact window opening.

16. The liquid crystal display panel according to claim 10, wherein the first patterned pixel electrode comprises a first region and at least one slit distribution area;
a plurality of liquid crystal molecules of the liquid crystal layer has a plurality of inclining directions, wherein the first region is disposed at an inclining center of the inclining directions of the liquid crystal molecules, and the slit distribution area stabilizes the inclining directions of the liquid crystal molecules.

17. The liquid crystal display panel according to claim 10, wherein the first patterned pixel electrode comprises a non-pixel electrode coverage area and at least one slit distribution area, and the slit distribution area surrounds the non-pixel electrode coverage area.

18. The liquid crystal display panel according to claim 10, wherein the second patterned pixel electrode comprises a second complete coverage area and at least one slit distribution area, and the slit distribution area is radially distributed outwards from a center of the second complete coverage area.

19. The liquid crystal display panel according to claim 10, further comprising a color filter layer, disposed above the common electrode.

20. A fabricating method of a substrate with a multi-domain vertical alignment pixel structure, wherein the substrate is opposite to a counter substrate with a common electrode and a liquid crystal layer is disposed between the substrate and the counter substrate, the fabricating method comprising:
providing a substrate;
forming a scan line, a data line and an active device on the substrate, wherein the scan line and the data line divide the substrate into a plurality of pixel regions, and the active device is electrically connected with the scan line and the data line;
forming a first patterned pixel electrode on the substrate to be electrically connected with the active device;
forming a voltage drop layer on the first patterned pixel electrode; and
forming a second patterned pixel electrode on the voltage drop layer and the second patterned pixel electrode is electrically connected with the active device;
wherein the first patterned pixel electrode and the second patterned pixel electrode are equipotential, the first patterned pixel electrode provides a first electrical field to the liquid crystal layer, the second patterned pixel electrode provides a second electrical field to the liquid crystal layer, and the voltage drop layer makes the first electrical field smaller than the second electrical field.

21. A substrate with a multi-domain vertical alignment pixel structure, comprising:
a scan line and a data line;
a first active device, electrically connected with the corresponding scan line and data line;
a second active device, electrically connected with the corresponding scan line and data line;
a first patterned pixel electrode, electrically connected with the first active device and having a plurality of first strip electrodes;
a passivation layer, disposed on the first patterned pixel' electrode; and
a second patterned pixel electrode, electrically connected with the second active device and having a plurality of second strip electrodes;
wherein the first strip electrodes and the second strip electrodes are partially overlapped, and the second strip electrodes are shifted for a predetermined distance from the first strip electrodes.

22. The substrate with the multi-domain vertical alignment pixel structure according to claim 21, wherein the predetermined distance is ranging from 0.1 μm to 2.5 μm.

23. The substrate with the multi-domain vertical alignment pixel structure according to claim 22, wherein the predetermined distance is ranging from 0.5 μm to 1.5 μm.

24. The substrate with the multi-domain vertical alignment pixel structure according to claim 21, wherein a total width after each of the first strip electrodes and each of the second strip electrodes are overlapped is ranging from 3.6 μm to 6 μm.

25. The substrate with the multi-domain vertical alignment pixel structure according to claim 24, wherein a total width after each of the first strip electrodes and each of the second strip electrodes are overlapped is ranging from 4 μm to 5 μm.

26. A liquid crystal display panel, comprising:
a substrate, comprising:
a scan line and a data line, disposed on the substrate;
a first active device, disposed on the substrate and electrically connected with the corresponding scan line and data line;
a second active device, disposed on the substrate and electrically connected with the corresponding scan line and data line;

a first patterned pixel electrode, electrically connected with the first active device and having a plurality of first strip electrodes;
a passivation layer, disposed on the first patterned pixel electrode; and
a second patterned pixel electrode, electrically connected with the second active device and having a plurality of second strip electrodes;
a counter substrate, having a common electrode, wherein the counter substrate is disposed on a counter side of the substrate, and the common electrode is corresponding to the first and the second patterned pixel electrodes; and
a liquid crystal layer, sandwiched between the counter substrate and the substrate;
wherein the first strip electrodes and the second strip electrodes are partially overlapped, and the second strip electrodes are shifted for a predetermined distance from the first strip electrodes.

27. A substrate with a multi-domain vertical alignment pixel structure, comprising:
a scan line and a data line;
a first active device, electrically connected with the corresponding scan line and data line;
a second active device, electrically connected with the corresponding scan line and data line;
a patterned pixel electrode, having a first region and a second region, wherein the first region is electrically connected with the first active device, the second region is electrically connected with the second active device, and the first region and the second region have a boundary region therebetween;
a biased electrode, corresponding to the boundary region; and
a passivation layer, sandwiched between the biased electrode and the patterned pixel electrode.

28. The substrate with the multi-domain vertical alignment pixel structure according to claim 27, wherein an edge of the biased electrode is at a predetermined interval from an edge of the patterned pixel electrode of the second region in a direction from the second region to the first region.

29. The substrate with the multi-domain vertical alignment pixel structure according to claim 28, wherein the predetermined interval is ranging from 0 μm to 1 μm.

30. A liquid crystal display panel, comprising:
a substrate, comprising:
a scan line and a data line, disposed on the substrate;
a first active device, disposed on the substrate and electrically connected with the corresponding scan line and data line;
a second active device, disposed on the substrate and electrically connected with the corresponding scan line and data line;
a patterned pixel electrode, having a first region and a second region, wherein the first region is electrically connected with the first active device, the second region is electrically connected with the second active device, and the first region and the second region has a boundary region therebetween;
a biased electrode, corresponding to the boundary region; and
a passivation layer, sandwiched between the biased electrode and the patterned pixel electrode;
a common electrode, disposed on a counter side of the patterned pixel electrode; and
a liquid crystal layer, disposed between the common electrode and the patterned pixel electrode;
wherein an electrical field intensity of the first region is greater than an electrical field intensity of the boundary region, an electrical field intensity of the boundary region is greater than an electrical field intensity of the second region.

* * * * *